(12) United States Patent
Yildiz et al.

(10) Patent No.: US 11,997,384 B2
(45) Date of Patent: May 28, 2024

(54) FOCUS SETTING DETERMINATION

(71) Applicant: Arm Limited, Cambridge (GB)

(72) Inventors: Nerhun Yildiz, Loughborough (GB); Samuel Sándor Rot, Loughborough (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/974,242

(22) Filed: Oct. 26, 2022

(65) Prior Publication Data

US 2023/0043761 A1    Feb. 9, 2023

Related U.S. Application Data

(63) Continuation of application No. 17/011,535, filed on Sep. 3, 2020, now Pat. No. 11,533,423.

(30) Foreign Application Priority Data

Sep. 10, 2019   (GB) ...................... 1913014

(51) Int. Cl.
*H04N 23/67*      (2023.01)
*G06T 1/20*       (2006.01)
(Continued)

(52) U.S. Cl.
CPC ............ *H04N 23/673* (2023.01); *G06T 1/20* (2013.01); *G06T 1/60* (2013.01); *H04N 25/13* (2023.01)

(58) Field of Classification Search
CPC .... H04N 23/673; H04N 25/13; H04N 25/134; H04N 23/675; G06T 1/20; G06T 1/60; G06T 3/4015
(Continued)

(56) References Cited

U.S. PATENT DOCUMENTS 5,384,912 A       1/1995  Ogrinc et al.
11,082,606 B1 *   8/2021  Gamadia ................ G06T 7/80
                          (Continued)

FOREIGN PATENT DOCUMENTS

EP    3026888 A2     6/2016
JP    2001356384 A  12/2001
                   (Continued)

OTHER PUBLICATIONS

United Kingdom Combined Search and Examination report issued Mar. 11, 2020 for GB Application No. 1913014.5.
(Continued)

*Primary Examiner* — Lin Ye
*Assistant Examiner* — Chan T Nguyen
(74) *Attorney, Agent, or Firm* — EIP US LLP

(57) ABSTRACT

A method of determining a focus setting for an image capture device. The method comprises, for each of a plurality of image zones: obtaining a first value of a focus metric for the respective image zone using a first image captured with a first focus setting for the image capture device; obtaining a second value of the focus metric for the respective image zone using a second image captured with a second focus setting for the image capture device; and processing the first value and the second value to obtain an estimated focus setting for the respective image zone. The focus setting is determined by performing a weighted sum of the estimated focus setting for at least two of the plurality of image zones.

19 Claims, 13 Drawing Sheets

(51) Int. Cl.
*G06T 1/60* (2006.01)
*H04N 25/13* (2023.01)

(58) Field of Classification Search
USPC .......................................................... 348/353
See application file for complete search history.

(56) References Cited

U.S. PATENT DOCUMENTS

| | | |
|---|---|---|
| 2008/0159727 A1 | 7/2008 | Hamamura et al. |
| 2008/0291289 A1* | 11/2008 | Kurane ............... H04N 23/741 348/222.1 |
| 2012/0327291 A1 | 12/2012 | Takeuchi et al. |
| 2014/0184894 A1 | 7/2014 | Motta |
| 2017/0090149 A1 | 3/2017 | Galor et al. |
| 2018/0359432 A1* | 12/2018 | Horak ...................... H04N 5/33 |
| 2019/0051017 A1 | 2/2019 | Beek |
| 2020/0007783 A1 | 1/2020 | Ueguri |
| 2020/0267304 A1* | 8/2020 | Park ........................ H04N 23/76 |

FOREIGN PATENT DOCUMENTS

| | | |
|---|---|---|
| JP | 2011191617 A | 9/2011 |
| JP | 2016090838 A | 5/2016 |
| JP | 2016156950 A | 9/2016 |
| JP | 2019117395 A | 7/2019 |

OTHER PUBLICATIONS

United States Non-Final office action dated Jun. 8, 2022 for U.S. Appl. No. 17/011,535.

* cited by examiner

FOCUS SETTING DETERMINATION

CROSS-REFERENCE TO RELATED APPLICATIONS

This application is a continuation under 35 U.S.C. § 120 of U.S. patent application Ser. No. 17/011,535 filed Sep. 3, 2020, which claims the benefit under 35 U.S.C. § 119(a) and 37 CFR § 1.55 to United Kingdom patent application no. GB 1913014.5 filed on Sep. 10, 2019. Each of the above-referenced patent applications is incorporated by reference in its entirety.

BACKGROUND

Field of the Invention

The present invention relates to contrast-based autofocus of an image capture device.

Description of the Related Technology

It is known to include an image sensor in image capture devices such as smartphone cameras or digital cameras to capture images. To enhance the image quality of an image captured using an image sensor, a focus setting of the image capture device including the image sensor can be adjusted appropriately, so that the image is in focus in the plane of the image sensor.

It is known to control the focus setting of an image capture device using a process known as contrast-based autofocus (AF). Contrast-based AF may be performed by measuring contrast within an image of a scene captured by an image sensor with a number of different focus settings. The contrast generally increases as the focus of the image capture device improves. The focus setting used to capture the image with the highest contrast may be used as the focus setting for the image capture device for capturing subsequent images of the scene.

It is desired to improve contrast-based autofocus methods and systems.

SUMMARY

According to a first aspect, there is provided a method for contrast-based autofocus of an image capture device, the method comprising: obtaining sensor data representative of an image captured by the image capture device, wherein the sensor data comprises pixel values from respective sensor pixels of an image sensor of the image capture device; dynamically selecting a subset of the pixel values to generate selected sensor data representative of the subset of the pixel values; processing the selected sensor data to generate contrast data representative of a contrast-based characteristic of at least a portion of the image; and processing the contrast data to determine a focus setting for the image capture device.

According to a second aspect, there is provided a method of determining a focus setting for an image capture device, the method comprising: for each of a plurality of image zones: obtaining a first value of a focus metric for the respective image zone using a first image captured with a first focus setting for the image capture device; obtaining a second value of the focus metric for the respective image zone using a second image captured with a second focus setting for the image capture device; and processing the first value and the second value to obtain an estimated focus setting for the respective image zone; and determining the focus setting by performing a weighted sum of the estimated focus setting for at least two of the plurality of image zones.

According to a third aspect, there is provided a method of determining a focus setting for an image capture device, the method comprising: obtaining first focus data representative of a first value of a focus metric for at least a portion of a first image captured with a first focus setting for the image capture device; normalising the first value of the focus metric using a normalisation coefficient to generate a normalised first value of the focus metric; obtaining second focus data representative of a second value of the focus metric for at least a portion of a second image captured with the second focus setting for the image capture device; normalising the second value of the focus metric using the normalisation coefficient to generate a normalised second value of the focus metric; and processing the normalised first value of the focus metric and the normalised second value of the focus metric to determine the focus setting for the image capture device.

According to a fourth aspect, there is provided a system-on-a-chip configured to: obtain input data in a fixed point data format; convert a format of the input data from the fixed point data format to a floating data point format to generate compressed data; store the compressed data in local storage of the system-on-a-chip; retrieve the compressed data from the local storage; and convert a format of the compressed data from the floating point format to the fixed point format before processing the compressed data.

Further features will become apparent from the following description, given by way of example only, which is made with reference to the accompanying drawings.

DETAILED DESCRIPTION

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Introduction to Contrast-Based Autofocus

To put the examples herein into context, an example of contrast-based autofocus (AF) will first be described generally, with reference to FIGS. 1 and 2.

Figure 1:
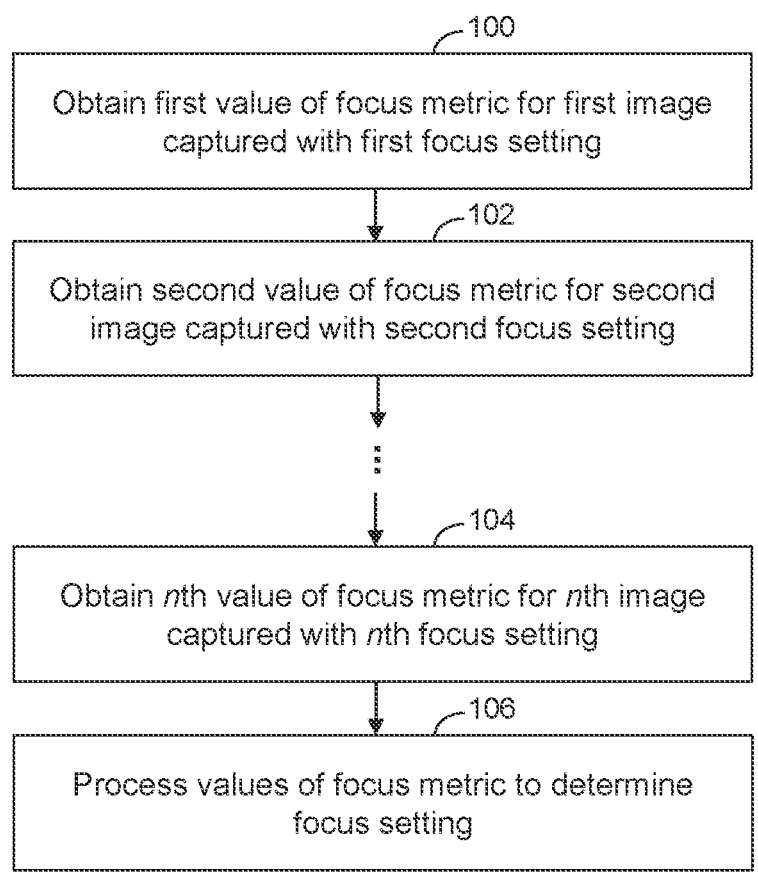
FIG. 1 is a flow diagram showing a method of determining a focus setting for an image capture device according to examples.

FIG. 1 is a flow diagram showing a method of determining a focus setting for an image capture device according to examples. The method of FIG. 1 is for contrast-based AF, which is for example an iterative process in which a focus setting for an image capture device is determined based on a value of a focus metric. The image capture device may for example be a smartphone camera, a standalone digital camera, a digital camera coupled to or incorporated in a further electronic device, or a computer. The focus setting is for example the position of a lens of the image capture device relative to an image sensor of the image capture device. The sharpness of an image captured by the image capture device typically depends on the focus setting. Hence, by determining the appropriate focus setting, images of a scene (or a region of interesting within the scene) can be captured which appear sharp, rather than diffuse or blurry.

At item 100 of FIG. 1, a first value of a focus metric is obtained for a first image captured by the image capture device with a first focus setting. Various different focus metrics may be used. For contrast-based AF, the focus metric for example represents or otherwise depends on or is based on a contrast within a captured image. Contrast is for example a difference in luminance and/or colour within an image (or image portion). A maximum contrast within an image (e.g. representing a difference between a maximum luminance and a minimum luminance) may be referred to as the contrast ratio or dynamic range. Contrast generally relates to relative differences rather than absolute values of luminance and/or colour, as the human visual system is more sensitive to these relative differences than absolute values of luminance and/or colour. Examples of generation of contrast data representative of a contrast-based characteristic of at least a portion of an image, for use in contrast-based AF, are described further with reference to FIGS. 3 to 8.

At item 102 of FIG. 1, a second value of the focus metric is obtained for a second image captured by the image capture device with a second focus setting. For example, the first image may be captured with the lens in a first position relative to the image sensor (such as with a first distance between a vertical axis of the lens and a vertical axis of the image sensor). The second image may be captured with the lens in a second position relative to the image sensor, which is different from the first position, such as at a second distance between the vertical axes of the lens and image sensor, respectively.

This process may be repeated iteratively until a plurality of images have been taken with a plurality of different focus settings, such as a plurality of different distances between the lens and the image sensor. Finally, at item 104 of FIG. 1, an nth value of the focus metric is obtained for an nth image captured by the image capture device with an nth focus setting. n is an integer and may be predetermined or pre-set. Alternatively, the value of n may be determined during the contrast-based AF process. For example, it may be decided to cease capturing further images once the value of the focus metric has reached a particular value or has altered by a certain absolute or relative amount compared to one or more previous values. For example, a hill-climbing algorithm may be used to obtain a plurality of focus metric values in a step-by-step fashion, for a plurality of different focus settings, while monitoring the change in the focus metric value. After the value of the focus metric drops by a certain percentage or more, after stepping through one or more different focus settings, it may be determined that the focus setting to use for subsequent image capture has been passed. Capture of subsequent images with further focus settings may therefore cease.

At item 106 of FIG. 1, the values of the focus metric are processed to determine the focus setting to use for the image capture device for subsequent capture of images of the scene. The value of the focus metric may be at a maximum when the image captured by the image capture device with a particular focus setting is in focus. That particular focus setting may then be selected as the focus setting to use for subsequent image capture, and may be considered to be an optimal focus setting for capture of the scene.

Figure 2:
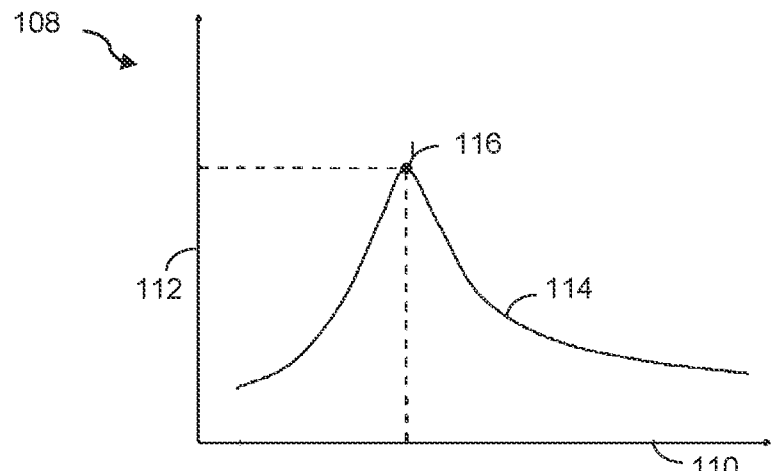
FIG. 2 is a graph showing schematically the relationship between a focus metric and a focus setting according to examples.

FIG. 2 is a graph 108 showing schematically the relationship between a focus metric and a focus setting, which in this case is a lens position of the lens of the image capture device. The x-axis 110 of the graph 108 shows the lens position relative to the image sensor and the y-axis 112 of the graph 108 shows the value of the focus metric. The curve 114 is obtained by fitting a polynomial to a plurality of values of the focus metric obtained for a plurality of lens positions during a contrast-based AF process. The curve 114 of FIG. 2 is an idealised curve, which has a peak point 116 corresponding to a maximum value of the focus metric. The lens position to use for the image capture device may be taken as the lens position corresponding to this peak point 116. The peak point 116 may be found analytically based on the curve 114. However, other cases may not involve the fitting of a curve to the obtained focus metric values. In such cases, the focus setting to use for subsequent image capture may be taken as the focus setting corresponding to the largest focus metric value obtained during the contrast-based AF process. Further examples of determining a focus setting are described in detail with reference to FIGS. 9 to 16.

Generation of Contrast Data for Contrast-Based Autofocus

Figure 3:
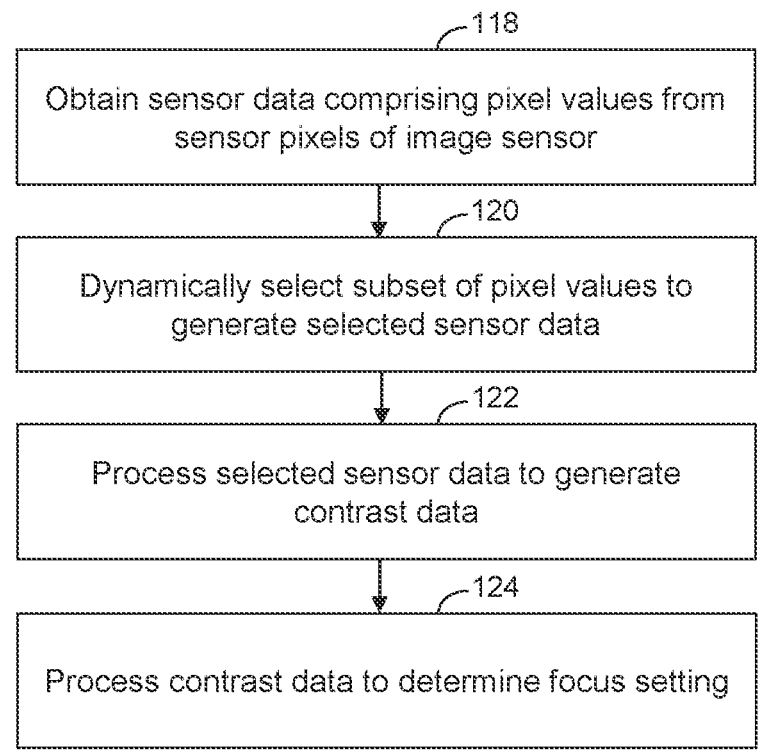
FIG. 3 is a flow diagram showing a method for contrast-based autofocus of an image capture device according to examples.

FIG. 3 is a flow diagram showing a method for contrast-based AF of an image capture device according to examples. At item 118 of FIG. 3, sensor data representative of an image captured by the image capture device is obtained. The image represented by the sensor data may be the entire image captured by the image capture device or a portion of a larger image. The sensor data includes pixel values from respective sensor pixels of an image sensor of the image capture device. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS).

The pixel values for example represent at least one characteristic of the light captured by the image sensor. For example, the sensor data may be representative of an intensity of the light captured by each sensor pixel, which may be proportional to the number of photons captured by that sensor pixel. The intensity may represent a luminance of the captured light, which is for example a measure of the intensity of light per unit area rather than an absolute intensity. In other examples, the sensor data may be representative of a brightness of captured light, which may be considered to correspond to a perception of a luminance, which may or may not be proportional to the luminance. In general, the sensor data may represent any photometric quantity or characteristic that may be used to represent the visual appearance of the image represented by the sensor data. The sensor data may be in any suitable format, such as a raw image format. For example, the sensor data may be streamed from the image sensor, with or without being saved to a framebuffer, without saving the raw sensor data to a file. In such cases, sensor data obtained after processing of the raw sensor data may, however, be saved to a file.

At item 120 of FIG. 3, a subset of pixel values is dynamically selected to generate selected sensor data representative of the subset of pixel values. Dynamic selection of the subset of pixel values for example corresponds to selection of the subset of pixel values which may change over time or which is not fixed or otherwise constant. For example, the subset of pixel values which are considered to be most reliable or to provide the most contrast information may be dynamically chosen, which may improve a contrast-based AF process performed using these pixel values.

At item 122 of FIG. 3, the selected sensor data is processed to generate contrast data representative of a contrast-based characteristic of at least a portion of the image. A contrast-based characteristic is for example any feature of the image (or a portion of the image) which is representative of a contrast of the image or which allows a contrast to be determined or otherwise derived. There are many different contrast-based characteristics that may be used. For example, contrast-based characteristics may represent variations in a spatial or frequency domain of an image, such as edges in an image.

At item 124 of FIG. 3, the contrast data is processed to determine a focus setting for the image capture device. The contrast data may represent a value of a focus metric, which may be used to obtain a focus setting for example as described with reference to FIGS. 1 and 2 or with reference to FIGS. 9 to 16. Alternatively, the contrast data may be processed to obtain a value of the focus metric, which may be in turn used to obtain the focus setting for example as described with reference to FIGS. 1 and 2 or with reference to FIGS. 9 to 16.

In some cases, the sensor data may be obtained by an image capture device including a colour filter array. An example of a colour filter array 126 is shown schematically in FIG. 4. The colour filter array 126 of FIG. 4 includes a pattern of colour filter elements. Colour filter elements correspond to respective sensor pixels of an array of sensor pixels of the image sensor. For example, the colour filter array 126 may be considered to form a mosaic or repeating pattern. A colour filter element generally allows light of a particular colour to pass through to the corresponding sensor pixel. In this way, the colour filter array allows different sensor pixels of the array of sensor pixels to receive different colours of incident light, allowing a full-colour image to be captured. As typical photosensors are not sensitive to the wavelength of incoming light, typical sensor pixels would be unable to provide colour information from the detected light without a colour filter array. However, by separating incoming light into different wavelength ranges, corresponding to different colours, using the colour filter array, the intensity of light in these different wavelength ranges can be ascertained, allowing this colour information to be determined. Red colour filter elements are labelled with an "R", green colour filter elements are labelled with a "G", and blue colour filter elements are labelled with a "B" in FIG. 4.

It is to be appreciated that a colour may refer to any range of wavelengths of light. For example, a clear, transparent or white colour filter element may nevertheless be considered to be a colour filter element in the sense that the colour filter element allows these particular wavelengths (such as all or substantially all) wavelengths in the visible spectrum to be transmitted to the underlying sensor pixel. In other examples, some or all of the colour filter elements may be non-white colour filter elements.

A pattern of colour filter elements may be formed of repeating groups of colour filter elements. A group 128 of colour filter elements may for example include a red colour filter element, a blue colour filter element and two green colour filter elements. The colour filter array may therefore correspond to a Bayer pattern, although other groups are possible in other examples. Each group may correspond with the necessary sensor pixels to obtain a full-colour image of a suitable quality.

Figure 4:
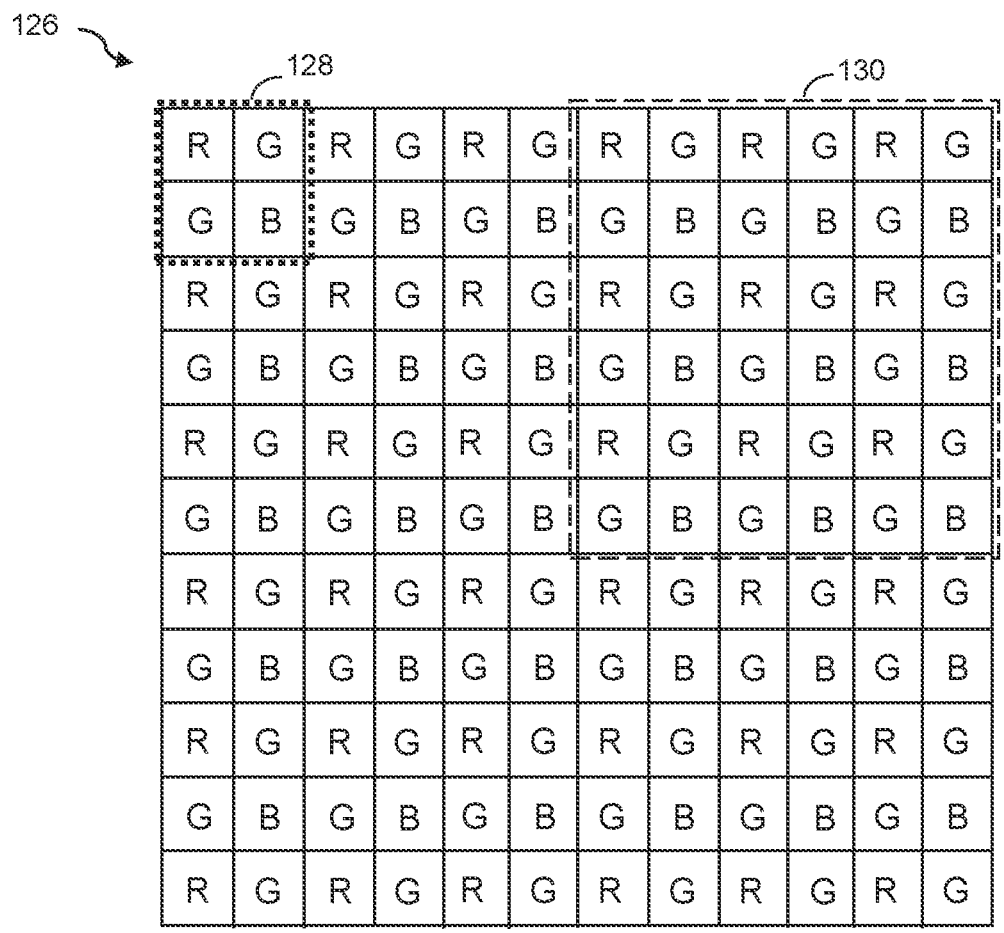
FIG. 4 is a schematic diagram showing a colour filter array according to examples.

The method of FIG. 3 may be used to determine a focus setting for the image capture device including the colour filter array 126 of FIG. 4. In examples, such as that of FIG. 4, the subset of the pixel values which are used to generate the contrast data are dynamically selected based on intensity data representative of an intensity of light received by at least one of the sensor pixels. For example, if the intensity of light obtained by sensor pixels for a given image region is relatively low, such as less than or equal to a given threshold, the image region may be considered to be unreliable or to provide relatively little contrast information. Similarly, if analysis of the intensity of light from these sensor pixels indicates that this image region suffers from a relatively high level of noise, this image region may be considered unreliable. Pixel values of these sensor pixels may therefore be omitted from the subset of the pixel values which are selected. In FIG. 4, pixel values from a subset of sensor pixels corresponding to a subset 130 of colour filter elements are selected for further processing. As the subset 130 of colour filter elements includes colour filter elements of multiple different colours (red, green and blue in this case), the pixel values may undergo a demosaicing process before being processed to generate the contrast data. Demosaicing may be applied to input image data representative of a plurality of different colour channels (e.g. obtained by the sensor pixels corresponding to the colour filter array 126) to reconstruct a full colour image. In such cases, the input image data includes an intensity value for solely one colour channel per pixel location, whereas the demosaicing allows an intensity value for each of at least one colour channel to be obtained for each pixel location. Demosaicing for example involves interpolating between adjacent pixels of the same colour channel to obtain a value at a location between these adjacent pixels, such as at a location corresponding to a pixel of a different colour channel. This may be performed for each of a plurality of colour channels in order to obtain, at each pixel location, an intensity value for each of the colour channels. In some cases, grayscale demosaicing may be performed, in which a grayscale intensity is obtained at each pixel location, indicating an intensity value for a single colour channel (e.g. from white (lightest) to black (darkest)).

By dynamically selecting the subset of the pixel values, a more accurate or otherwise more reliable contrast-based characteristic may be obtained for the image or image portion, for example by excluding unreliable regions. For example, the subset of the pixel values may change over time or with the image capture device used in different environments, with different lighting conditions. This allows an improved contrast-based characteristic to be obtained in a more flexible way than if the sensor pixels that are used for contrast-based AF are fixed or unchanging. Furthermore, by processing a subset of the pixel values rather than the full set of the pixel values, the contrast data may be obtained more efficiently.

In some cases, the subset of pixel values which are dynamically selected is a first subset of pixel values from a first subset of sensor pixels corresponding to colour filter elements of a first colour. For example, if the intensity of light captured by the first subset of sensor pixels is relatively high, such as equal to or exceeding a threshold, or is relatively high compared to the intensity of light captured by other sensor pixels corresponding to colour filter elements of a different colour, the first subset of sensor pixels may be selected. This may be determined based on the intensity of light captured by at least one of the first subset of sensor pixels and/or at least one of the other sensor pixels. For example, the contrast-based characteristic may be more sensitive to changes in contrast if the intensity of light is higher. Hence, generating the contrast-based characteristic using sensor pixels with a higher intensity of captured light may improve the accuracy of the contrast-based characteristic. This may be performed dynamically, allowing the focus setting to be accurately determined in various different lighting conditions. For example, if the image capture device is used in an environment illuminated primarily by green light, the subset of pixel values selected may be those obtained by sensor pixels associated with green colour filter elements. If the same image capture device is then used in an environment illuminated primarily by red light, the subset of pixel values selected may be those obtained by sensor pixels associated with red colour filter elements.

In some cases, the sensor data includes a second subset of pixel values from a second subset of sensor pixels corresponding to colour filter elements of a second colour and/or a third subset of pixel values from a third subset of sensor pixels corresponding to colour filter elements of a third colour. This may be the case in an RGB (red, green, blue) image capture device, such as an image capture device with the colour filter array 126 of FIG. 4. In such cases, the selected sensor data may be generated using the first subset of pixel values without using the second subset of pixel values and/or without using the third subset of pixel values. For example, the subset of pixel values may be obtained solely from sensor pixels associated with a colour filter element of the same colour. This for example simplifies the contrast-based AF process, as the contrast-based AF process may be performed on the raw sensor data, without demosaicing the sensor data. This allows the contrast-based AF process to be performed more efficiently than otherwise.

Figure 5:
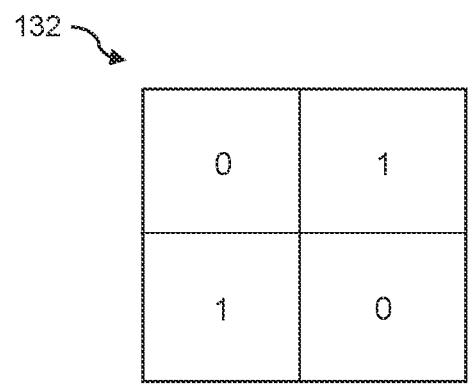
FIG. 5 is a schematic diagram showing a mask to be applied to pixel values obtained from the colour filter array of FIG. 4 according to examples.

In examples, dynamically selecting the subset of pixel values may include setting a further subset of the pixel values to a predetermined value. For example, the predetermined value may be zero. This may be considered to correspond to masking the sensor data, to generate masked sensor data. FIG. 5 shows schematically an example of a mask 132 which may be applied to pixel values obtained from the array of sensor pixels associated with the colour filter array 126 of FIG. 4. A mask is for example an array of values, such as scalar values, which may be multiplied with the pixel values obtained by the sensor pixels, in order to straightforwardly set unselected pixel values to the predetermined value. For example, the mask may include the same number of columns and rows as an array of pixel values (for example corresponding to the colour filter array 126 or a portion of the colour filter array 126) to which the mask is to be applied. In other examples, such as that of FIG. 5, the mask 132 may be smaller than the array of sensor pixels. In such cases, the pixel values may be dynamically selected by sliding or otherwise moving the mask 132 across an array of the pixel values. In FIG. 5, the mask 132 is a 2×2 mask, with a dimensionality corresponding to the group 128 of sensor pixels of FIG. 4, which for example corresponds to a repeating unit of sensor pixels. The mask 132 of FIG. 5 may therefore be represented using 4 bits, although this is merely an example. In the example of FIG. 5, the elements of the mask 132 corresponding to green colour filter elements of the group 128 are set to 1 and the elements of the mask 132 corresponding to blue and red colour filter elements of the group 128 are set to 0. Hence, when each element of the mask 132 is multiplied by the pixel value obtained by the corresponding sensor pixel, the pixel values obtained by the sensor pixels associated with green colour filter elements remain unchanged, and are selected as the subset of pixel values. However, the pixel values obtained by the sensor pixels associated with red and blue colour filter elements are set to zero (which is the predetermined value in this case) and are therefore de-selected, and do not form part of the subset of pixel values. This is merely an example, though, and in other cases the subset of pixel values may be selected in a different way.

After dynamically selecting the subset of pixel values to generate the selected sensor data, the selected sensor data is processed in examples in accordance with FIG. 3 to generate contrast data.

Figure 6:
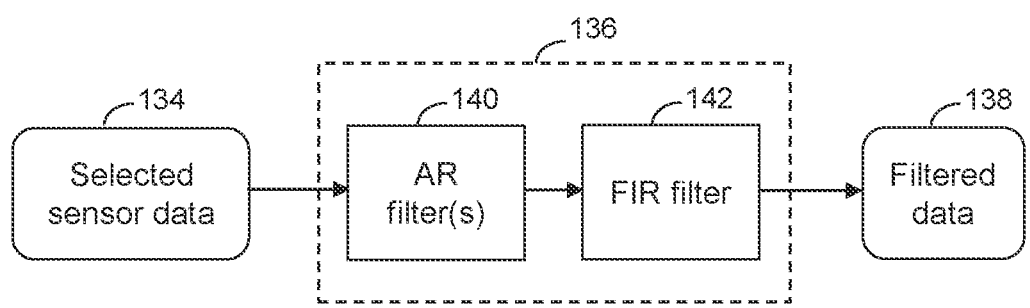
FIG. 6 is a schematic diagram showing generation of filtered data according to examples.
Figure 7:
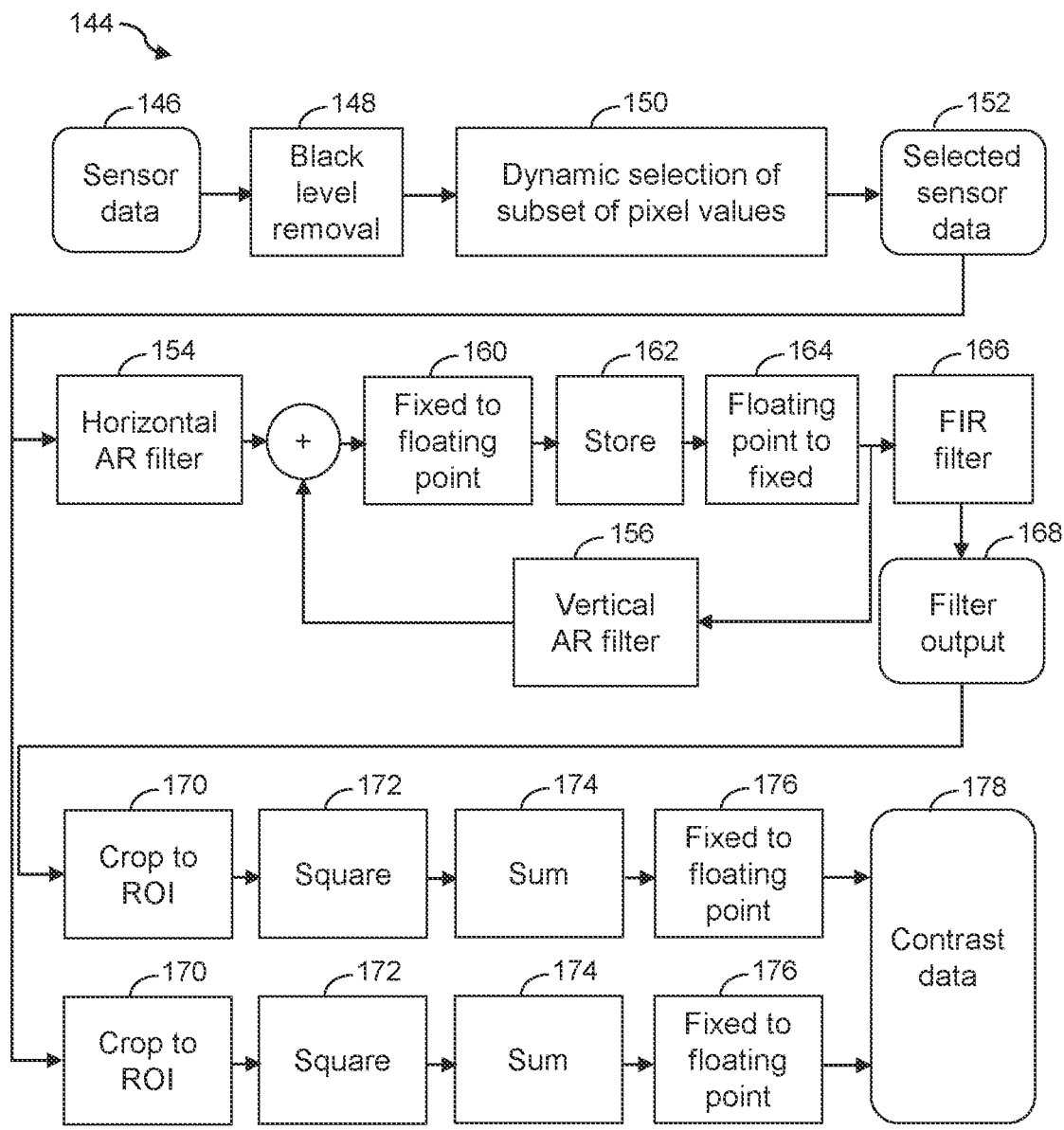
FIG. 7 is a schematic diagram showing generation of contrast data according to examples.
Figure 8:
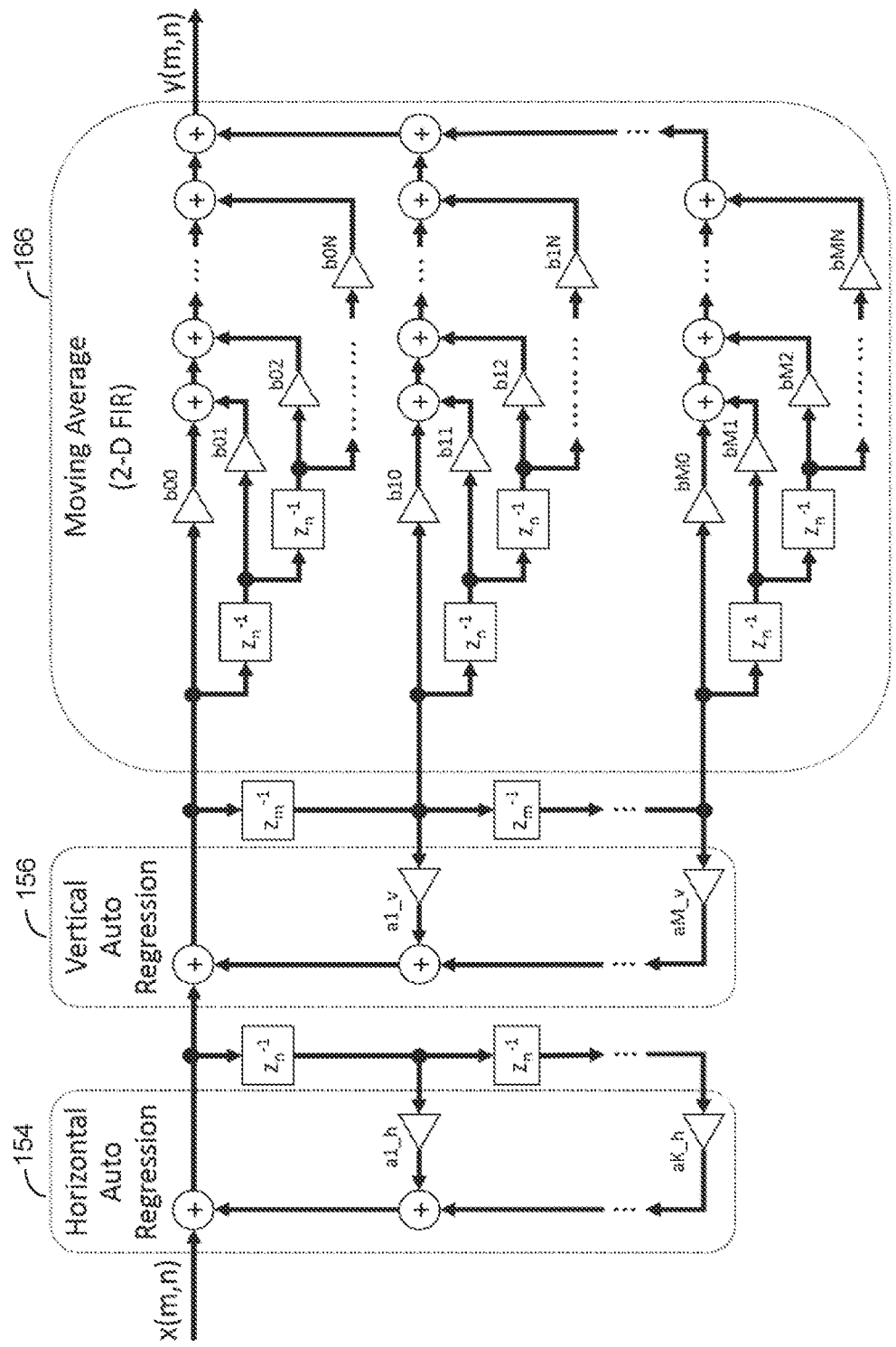
FIG. 8 is a schematic diagram showing features of a band-pass filtering process according to examples.

FIG. 6 is a schematic diagram showing generation of filtered data according to examples, which may correspond to or be used to generate contrast data as described further with reference to FIGS. 7 and 8.

In FIG. 6, selected sensor data 134 is obtained, for example as described with reference to FIGS. 4 and 5. The selected sensor data 134 is processed using a band-pass filtering process 136 to generate filtered data 138. The filtered data 138 may then be used as, or processed to generate, the contrast data. The band-pass filtering process 136 may be used to suppress low- and high-frequency components of an image represented by the selected sensor data 134. For example, low-frequency components of the image may not provide sufficient information regarding a contrast of the image. Conversely, while high-frequency components of the image may be sensitive to high-contrast image features (such as edges in the image), these components may be subject to noise. Hence, the signal to noise ratio may be highest in an intermediate band of frequencies, which may be selected by processing the image using the band-pass filtering process 136.

In the example of FIG. 6, the band-pass filtering process 136 includes processing the selected sensor data 134 with at least an autoregressive (AR) filter 140 and a finite impulse response (FIR) filter 142. Together, the AR filter 140 and the FIR filter 142 may be considered to correspond to an infinite impulse response (IIR) filter. The value output by the AR filter(s) 140 for example depends on at least one previous output of the AR filter(s) 140 as well as a stochastic term (which is for example imperfectly predictable). As the value output by the AR filter(s) 140 depends on the previous outputs of the AR filter(s) 140, the AR filter(s) 140 can effectively capture information for an indefinite number of samples. The value output by the FIR filter 142 for example depends on a given number of the most recent samples of an input signal (such as pixel values represented by the selected sensor data 134), which allows noise to be removed in an efficient way.

The filtered data 138 generated by the band-pass filtering process 136 is for example indicative of edges in the image represented by the selected sensor data 134. For example, the filtered data 138 may represent a filtered value for each respective pixel value input to the band-pass filtering process 136. A higher filtered value may be considered to represent higher gradient associated with the sensor pixel from which the pixel value was obtained, indicating that the corresponding image portion includes a sharper edge. In general, higher filtered values may therefore be considered to indicate greater contrast.

FIG. 7 shows schematically a pipeline 144 for generating contrast data according to examples. The contrast data may be processed to determine a focus setting for an image capture device.

Sensor data 146 is obtained, for example as described with reference to FIGS. 3 to 5. The sensor data 146 represents an image captured by the image capture device and includes pixel values from respective sensor pixels of an image sensor of the image capture device. The sensor pixels may be arranged in an array comprising rows and columns, for example to correspond to colour filter elements of a colour filter array, although this is merely an example.

In this case, the pixel values represented by the sensor data 146 include pedestal values, which are for example constant values which are added to pixel values to avoid negative pixel values during the image capture process. For example, the image sensor may still register a non-zero pixel value even when exposed to no light, e.g. due to noise. To avoid reducing the pixel values to less than zero, the pedestal values may be added. Hence, before further processing is performed, the sensor data 146 undergoes black level removal 148 in FIG. 7, to remove the pedestal values. It is to be appreciated that, in some cases, black level removal may be performed at a different stage of an image processing pipeline, or may be omitted in some cases (for example, if no pedestal values are added).

At item 150 of FIG. 7, a subset of pixel values represented by the sensor data 146 is dynamically selected, e.g. as described with reference to FIGS. 3 to 5. This generates selected sensor data 152, which is representative of the subset of pixel values. The selected sensor data 152 is processed using a band-pass filtering process, which may be similar to or the same as that of FIG. 6. In this example, the band-pass filtering process includes a horizontal AR filter 154 and a vertical AR filter 156. The horizontal AR filter 154 is arranged to filter pixel values from a plurality of the columns of the array of sensor pixels. The vertical AR filter 156 is arranged to filter pixel values from a plurality of the rows of the array of sensor pixels. The horizontal and vertical AR filters 154, 156 are each for example one dimensional (1D) filters but in different respective dimensions. For example, the horizontal AR filter 154 may have a width of k entries in a first dimension (e.g. the x, or horizontal, direction) corresponding to pixel values obtained from sensor pixels in k different columns, where k is an integer, and a length of 1 in a second dimension (e.g. the y, or vertical, direction). Conversely, the vertical AR filter 156 may have a width of 1 in the first dimension, and a length of m entries corresponding to pixel values obtained from sensor pixels in m different columns, where m is an integer, in the second dimension. For example, the horizontal AR filter 154 may be a 3×1 dimension tensor and the vertical AR filter 156 may be a 1×3 dimension tensor. Using both the horizontal and vertical AR filters 154, 156 as part of the band-pass filtering process allows increased contrast information to be obtained from the image represented by the selected sensor data 152 compared with e.g. using solely the horizontal AR filter 154 or using solely the vertical AR filter 156.

In examples such as that of FIG. 7, the selected sensor data 152 is processed for a plurality of rows, sequentially in raster order, with the horizontal AR filter 154. For example, the selected sensor data 152 relating to rows or lines of pixel values may be processed on a row-by-row basis. In other words, the horizontal AR filter 154 may process the selected sensor data 152 for one row of pixel values at a time. It is to be appreciated, though, that some of the pixel values of a given row may not be processed, e.g. if these pixel values are not part of the subset of pixel values selected at item 150. In other cases, the pixel values that have not been selected may nevertheless be processed by the horizontal AR filter 154, but may take a default or otherwise predetermined value, such as zero, for example by processing these pixel values with a mask as described with reference to FIG. 5. Processing the selected sensor data 152 with the horizontal AR filter 154 may also involve retrieving the selected sensor data 152 (or the sensor data 146) from storage accessible to the pipeline 144 in raster order.

The output of the horizontal AR filter 154 may be obtained on a row-by-row basis. However, the vertical AR filter 156 typically involves processing the subset of pixel values from a plurality of rows, which for example involves accumulating an output of the vertical AR filter 156 for each of the plurality of rows.

The data generated by the horizontal AR filter 154 may be stored in storage, such as storage which is local to or otherwise accessible to the pipeline 144. To reduce storage requirements, the example pipeline 144 of FIG. 7 involves processing the selected sensor data 152 for a plurality of rows, sequentially in raster order, with the horizontal AR filter 154, to generate a plurality of sets of first data in a fixed point data format. Each set of the first data corresponds to a respective row of the plurality of rows. A fixed point data format (sometimes referred to as a fixed point data type) represents a number with a fixed number of digits after (and sometimes before), the decimal point. The fixed point data format may represent the first data using a relatively large number of bits, such as 41 bits. While this may improve the accuracy of processing of the first data, the storage requirements for such data may be correspondingly high. Hence, at item 160 of FIG. 7, a format of the plurality of sets of first data may be converted from the fixed point data format to a floating point data format to generate second data. The floating point data format for example approximates numbers by representing a number in the form of significand x base$^{exponent}$ using a certain number of bits (e.g. 5) to represent the exponent and a further number of bits (e.g. 10) to represent the significand. The base may be fixed (e.g. as base 10) and a bit may also be used to represent the sign of the number, so that negative numbers may be represented. This allows very small and very large numbers to be represented efficiently. By converting the format of the plurality of sets of first data from the fixed point data format to the floating point data format, the number of bits used to represent the plurality of sets of first data may be reduced. In other words, the second data may be smaller in size than the first data. For example, the second data may be 16 bits in size, whereas each set of first data may be 41 bits in size.

At item 162 of FIG. 7, the second data is stored in storage, which is for example local storage of the pipeline 144. The second data may have reduced storage requirements than the first data, and may be stored and retrieved more efficiently than if the first data was stored without first converting it to the floating point data format.

At least a portion of the second data may subsequently be obtained from the storage. The portion of the second data may be obtained after the selected sensor data for at least a first one of the plurality of rows has been processed with the horizontal AR filter 154. The format of at least the portion of the second data is converted from the floating point data format to the fixed point data format at item 164 of FIG. 7 to generate third data. The third data may then be processed with the vertical AR filter 156. By processing the third data in the fixed point data format, an output of the vertical AR filter may be obtained without rounding, improving the accuracy of the processing. In some cases, the plurality of sets of first data output by the horizontal AR filter 154 for a given row may be processed on a row-by-row basis using the vertical AR filter 156. In such cases, an output of the vertical AR filter 156 applied to a given set of first data may be converted from the fixed point data format, stored in storage, and subsequently retrieved for use as an input to a subsequent iteration of the vertical AR filter 156 (which for example also receives a set of first data from a subsequent row as an input). The output of the subsequent iteration of the vertical AR filter 156 may itself be converted from the fixed point data format to the floating point data format, stored in storage, and subsequently retrieved from storage and converted to the fixed point data format. A similar process may then be repeated for yet further iterations of processing by the vertical AR filter 156.

At item 166, the data output by the AR filters (in this case, the horizontal and vertical AR filters 154, 156), which may be referred to as third data, is processed by an FIR filter 166 to generate filtered data. In FIG. 7, the output of the FIR filter 166 is a filter output, which is then further processed to obtain the filtered data. However, in other examples, the output of the FIR filter 166 may be the filtered data itself. The FIR filter 166 is for example a two-dimensional filter. The FIR filter 166 may include at least 3 lines (e.g. in a vertical dimension), such that a dimensionality of the FIR filter 166 is at least n×3, where n is an integer. Such a dimensionality has been found to generate a filter output which is sensitive to changes in contrast. In some cases, the FIR filter 166 includes a plurality of lines of filter coefficients, and filter coefficients of a second line between a first line and an nth line are each zero. By including some zero coefficients, processing of data by the FIR filter 166 may be performed more efficiently. Moreover, the inclusion of zero coefficients for a second line (e.g. a middle line) the FIR filter 166 may act appropriately as a band-pass filter. In some cases, more than one line of the FIR filter 166, such as at least two lines of the FIR filter 166 which are not the top or bottom line of the FIR filter 166 may include zero coefficients in some or all of its entries.

The FIR filter may include a horizontal FIR filter to filter pixel values from a plurality of the columns and a vertical FIR filter to filter pixel values from a plurality of the rows, similar to the horizontal and vertical AR filters 154, 156. The order of the horizontal and vertical FIR filters may be the same as or different from each other.

Examples of the horizontal and vertical AR filters 154, 156 and the FIR filter 166 are shown schematically in FIG. 8. The term x(m, n) represents the subset of pixel values in the form of an array with m columns and n rows. The horizontal AR filter 154 in this case is a kth order horizontal AR filter, the vertical AR filter 156 is an mth order vertical AR filter and the FIR filter 166 is an m x nth order 2D FIR filter, where k, m and n are each integers. The values a1_h . . . ak_h represent filter coefficients of the horizontal AR filter 154, the values a1_v . . . am_h represent filter coefficients of the vertical AR filter 156 and the values b00 . . . b0N, b10 . . . b1N, bm0 . . . bmn represent filter coefficients of the FIR filter 166. $z_n^{-1}$ represents a horizontal delay and $z_m^{-1}$ represents a vertical delay.

As can be seen from FIG. 8, the first row processed by the FIR filter 166 in this example is received directly from an addition operation of the vertical AR filter 156 (wherein an addition operation is indicated in FIG. 8 as a plus sign within a circle) without buffering. Hence, in this case, the first row need not be stored. Some bit manipulation (e.g. discarding of most and/or least significant bits of the output of the horizontal AR filter 154 and/or the vertical AR filter 156) may also be performed before these outputs are processed by further components (although this is not shown in FIG. 8).

Subsequent rows processed by the FIR filter 166 are retrieved from storage (e.g. from a respective delay line buffer). These subsequent rows may undergo conversion from fixed to floating point data format before storage, and then subsequent conversion from floating point to fixed point data format after retrieval from the storage and before processing by the FIR filter 166.

In examples in which the filter coefficients of the FIR filter 166 for at least one line are zero (e.g. for all lines between a first line and a last line of the FIR filter 166) the output of the vertical AR filter 156 for the rows associated with these lines of the FIR filter 166 need not be retrieved from storage, as the output of the FIR filter 166 for these rows may be assumed to be zero. This may reduce processing requirements.

Referring back to FIG. 7, at least one least significant bit (LSB) of the filter output 168 may be discarded before generating the contrast data. This may be used so that the bit size of the filter output 168 (and filtered data generated using the filter output 168) matches a bit size of the selected sensor data 152, which may be processed with the filtered data to generate the contrast data. By discarding at least one LSB, the bit size of the filter output may be reduced without unduly affecting or reducing the contrast information obtainable from the filter output.

At item 170, the filter output 168 is cropped to a region of interest (ROI). For example, this may involve retaining filtered values represented by the filter output 168 that correspond to a particular region of sensor pixels, such as a region of the sensor pixels corresponding to an ROI in an image. Item 170 may be omitted in some cases, though, for example if the sensor data 146 represents an ROI of an image rather than an entire image, or if the ROI corresponds to the entirety of the image.

At item 172, the cropped filter output is squared and, at item 174, summed. This for example involves squaring the filtered pixel values for the ROI (for the subset of pixel values that were dynamically selected). The squared pixel values are then added together. The summation may be performed for the entire image, the entire ROI or for a subset of the image or ROI, such as for an image zone. For example, a sum may be obtained for each of a plurality of image zones of an image. By processing the filter output in this way, filtered data may be generated. This is merely an example, though, and in other cases different processing may be applied to the filter output to generate the filtered data. A data format of the filtered data may be converted from the fixed point data format to the floating point data format at item 176 of FIG. 7. The filtered data may then be stored in storage accessible to the image capture device, such as local storage of the image capture device. In some examples, the filtered data may be considered to correspond to the contrast data itself. In such cases, the contrast data may be converted from the fixed point data format to the floating point data format before storing the contrast data in the storage accessible to the image capture device. In other cases in which the contrast data is generated in a fixed point data format (e.g. if item 176 of FIG. 7 is omitted), the contrast data may also be converted from the fixed point data format to the floating point data format before storing the contrast data in the storage accessible to the image capture device.

A similar process to items 170, 72, 176, 176 is applied to the selected sensor data 152 rather than the filter output 168. These items are labelled with the same reference numerals, and corresponding descriptions are to be taken to apply. By processing the selected sensor data 152 in this way, intensity characteristic data representative of an intensity-based characteristic of at least a portion of the image may be obtained. The intensity characteristic data may be converted to the floating point data format at item 176 of FIG. 7. It is to be appreciated, though, that in other cases, different processing may be applied to the selected sensor data 152 to generate the intensity characteristic data (which for example represents an intensity of the image or other intensity-based feature).

In FIG. 7, the contrast data 178 is generated using the filtered data and the intensity characteristic data. In this case, the intensity characteristic data represents the subset of the pixel values squared and then summed, which may be represented as I2 and the filtered data represents an output of the band-pass filter process, for each of the pixel values, squared and then summed, which may be represented as E2. The contrast data is generated by dividing the filtered data by the intensity characteristic data, i.e. to calculate E2/I2. This is merely an example, though. In other cases, generation of the intensity characteristic data may be omitted and the filtered data may be used as the contrast data without the intensity characteristic data. Furthermore, it is to be appreciated that the contrast data may be generated separately for each image zone of an image divided into image regions (referred to as image zones) or for an entire ROI or image.

In this example, the contrast data 178 is generated in the floating point data format, allowing the contrast data 178 to be stored efficiently in storage accessible to the pipeline 144.

After generation of the contrast data 178 for a given focus setting for the image capture device, further contrast data may be generated for at least one further focus setting. The contrast data 178 and the further contrast data may be used to determine a focus setting for the image capture device, e.g. as described with reference to FIGS. 1 and 2 or FIGS. 9 to 16. For example, the value represented by the contrast data 178 may be used as the value of the focus metric for the given focus setting, or may be processed further to obtain the value of the focus metric.

Determination of Focus Setting Using Contrast Data

Figure 9:
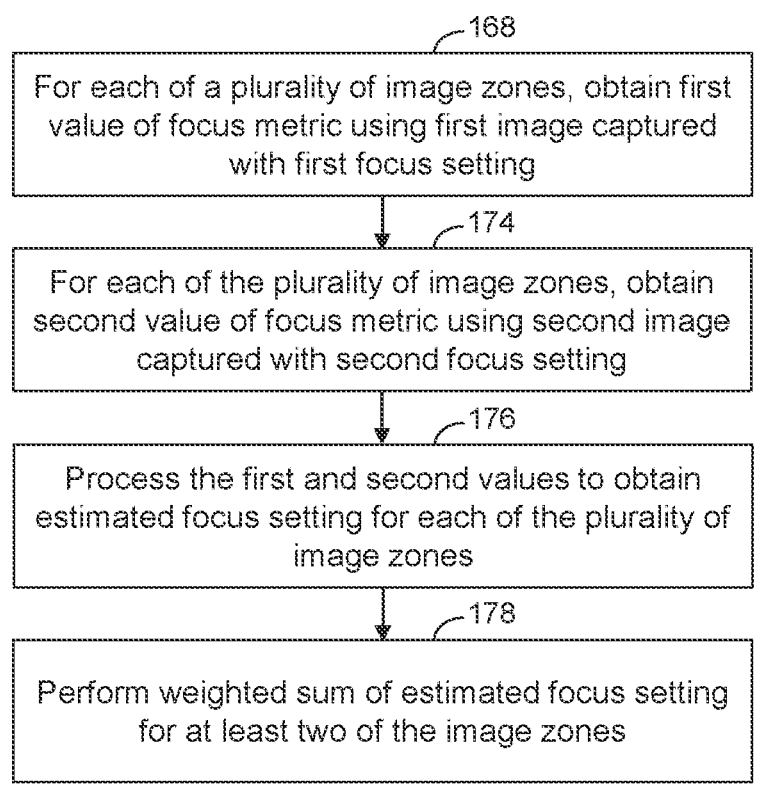
FIG. 9 is a flow diagram showing a method of determining a focus setting for an image capture device according to examples.
Figure 10:
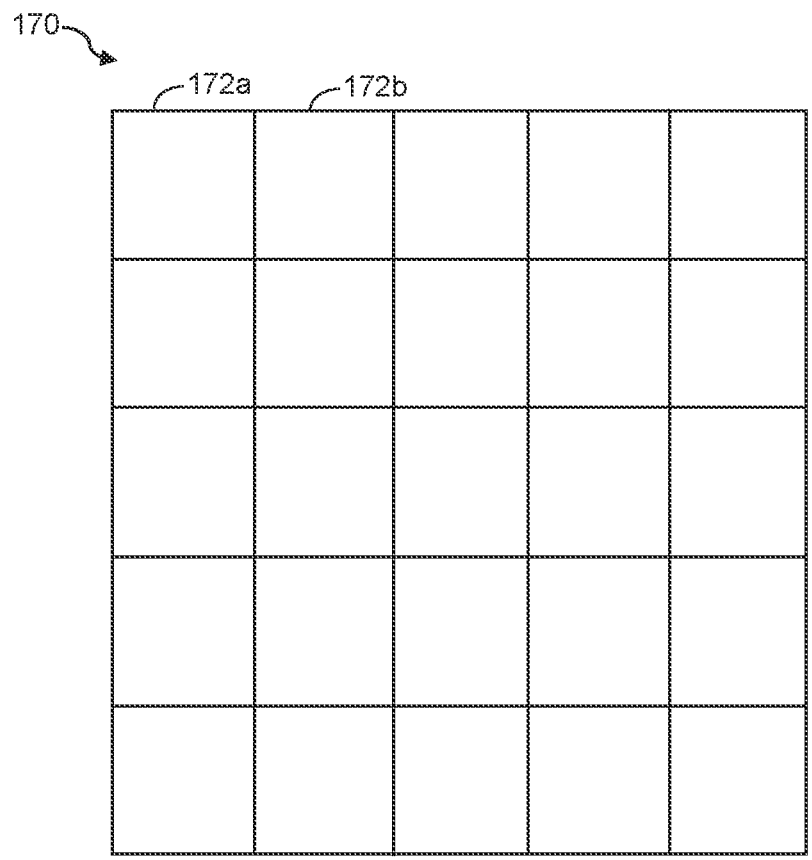
FIG. 10 is a schematic diagram showing image zones according to examples.

FIG. 9 is a flow diagram showing a method of determining a focus setting for an image capture device according to examples. At item 168, the method of FIG. 9 includes, for each of a plurality of image zones, obtaining a first value of a focus metric for the respective image zone using a first image captured with a first focus setting for the image capture device. The first image may be divided into zones in any suitable manner. An example of an image 170 divided into image zones 172 is illustrated schematically in FIG. 10. A first image zone 172a and a second image zone 172b are labelled in FIG. 10, but it is to be appreciated that the image 170 is divided into a plurality of image zones, collectively referred to with the reference numeral 172. In FIG. 10, each of the image zones 172 is the same size as each other, as the image 170 has been divided using a grid with square elements. However, in other examples, some of the image zones may be different sizes than others. For example, an image 170 may be divided into image zones based on processing of the image 170, e.g. to identify at least one ROI.

Referring back to FIG. 9, at item 174, for each of a plurality of image zones, a second value of the focus metric for the respective image zone using a second image captured with a second focus setting for the image capture device. The contrast data obtained as described with references to FIGS. 3 to 8 may represent the focus metric, for example. However, in other cases, the method of FIG. 9 may be performed with a different focus metric, such as one that is derived using a different contrast-based characteristic than that of FIGS. 3 to 8.

At item 176 of FIG. 9, the first value and the second value are processed, for each of the plurality of image zones, to obtain an estimated focus setting for the respective image zone. The first and second values may be processed in various different ways to obtain the estimated focus setting, as described further with reference to FIGS. 11 to 15.

At item 178 of FIG. 9, the focus setting is determined by performing a weighted sum of the estimated focus setting for at least two of the plurality of image zones. The weighted sum may for example account for different image characteristics of the at least two of the plurality of image zones, for example such that image zones corresponding to a ROI receive a higher weighting than other image zones.

Figure 11:
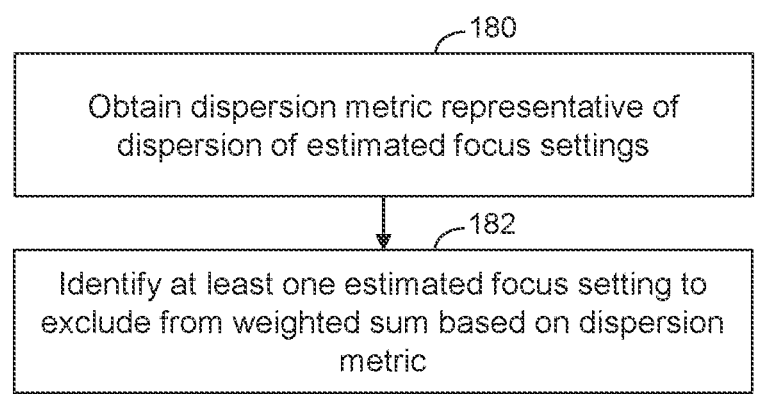
FIG. 11 is a flow diagram showing features of the method of FIG. 9 according to some examples.

FIG. 11 is a flow diagram illustrating features of performing the weighted sum of item 178, according to some examples. At item 180 of FIG. 11, a dispersion metric is obtained. The dispersion metric is representative of a dispersion of the estimated focus settings for the plurality of image zones, as obtained at item 176 of FIG. 9. The dispersion is for example a measure of an extent to which a distribution of the estimated focus settings is spread, such as standard deviation, variance or interquartile range.

Item 182 of FIG. 11 involves identifying at least one of the estimated focus settings to exclude from the weighted sum based on the dispersion metric. For example, estimated focus settings with values that are further from central value of a distribution of the estimated focus settings than a given threshold, which e.g. correspond to outliers, may be omitted from the weighted sum. In this way, a subset of the estimated focus settings may be used for the weighted sum, rather than all of the estimated focus settings. This may allow a more appropriate focus setting to be obtained, which is less sensitive to outlying values.

An average estimated focus setting, for example corresponding to the central value of the distribution of the estimated focus settings, may be obtained using at least two estimated focus settings, and in some cases all of the plurality of estimated focus settings. The average estimated focus setting may be a mean, mode or median, for example. The average estimated focus setting may be obtained prior to exclusion of outliers as per item 182 of FIG. 11, and then recalculated after such outliers have been removed from the distribution. In other cases, item 182 of FIG. 11 may be omitted. In either case, performing the weighted sum may include weighting the estimated focus settings for the at least two of the estimated focus settings for the at least two of the plurality of image zones based on a difference between the respective estimated focus setting and the average estimated focus setting. In this way, outliers that are further away from the average estimated focus setting are weighted with a smaller value than those which lie closer to the average estimated focus setting. This further reduces any undue impact on the obtained focus setting from outliers that are not reflective of an appropriate focus setting to use, such as image zones that are noisy or that correspond to a background of an image.

In some cases, the estimated focus setting for at least one of the image zones may be monitored over time. This allows unreliable image zones to be identified and removed or flagged as being unreliable. For example, as shown in FIG. 2, the value of a focus metric typically increases to a peak as the focus setting is changed in a given direction, and then begins to decrease as the focus setting is further changed in the given direction (e.g. in a direction of decreasing distance between the lens and the image sensor). If, however, the value of the focus metric increases, decreases, and then begins to increase again, this suggests that image zone is unreliable. Similarly, if the value of the focus metric continually decreases, without increasing, this also suggests that the image zone is unreliable. Unreliable image zones such as this may be omitted from the weighted sum of item 178 of FIG. 9, or may be weighted with a smaller weighting value. For example, for a given image zone, it may be determined that the estimated focus value for the image zone is to be excluded from the weighted sum based on a comparison between the first value and the second value.

It is to be appreciated that the method of FIG. 9 may be extended to obtain a plurality of values of the focus metric, each using an image captured with a different respective focus setting for the image capture device, for each of a plurality of zones. The plurality of values of the focus metric may be used to obtain the estimated focus setting for each of the plurality of zones. By testing a greater number of different focus settings for the image capture device, the appropriate focus setting to use for future image capture may be more accurately determined. For example, a plurality of values of the focus metric may be obtained for a predetermined set of different focus settings for the image capture device. In other cases, the method of FIG. 9 may be applied to obtain values of the focus metric for different focus settings until an estimated focus setting has been obtained for at least a predetermined number of proportion of image zones. For example, the method may cease to obtain values of the focus metric for further focus settings once an estimated focus setting has been found for at least 70% of the image zones, either of the image as a whole or of a subregion of the image, such as an ROI.

Figure 12:
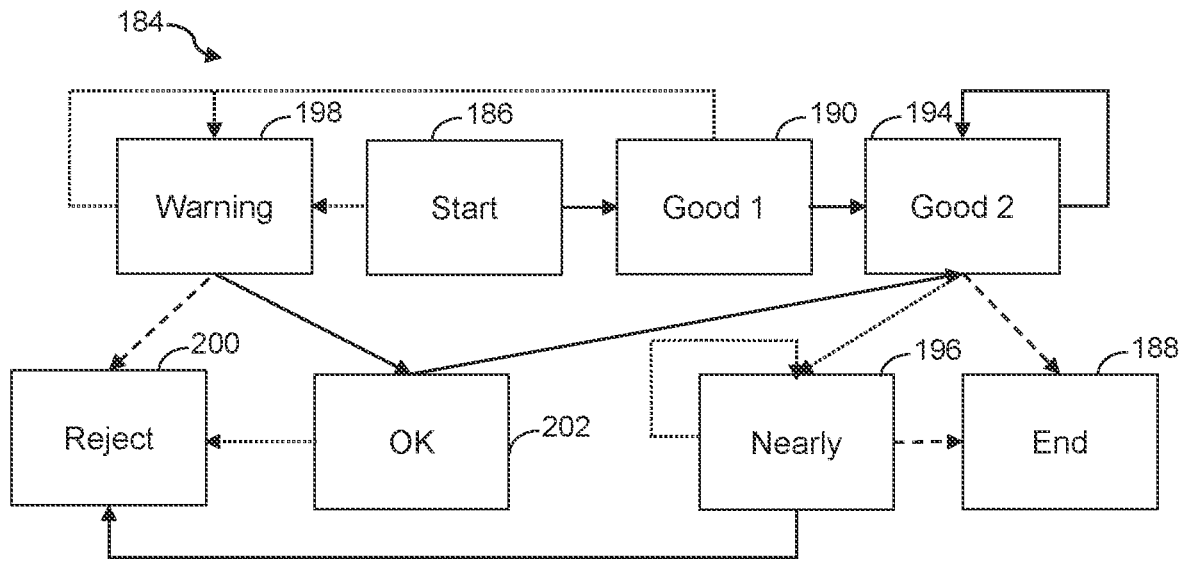
FIG. 12 is a schematic diagram of a finite-state machine according to examples.

In some cases, monitoring of the estimated focus setting for an image zone may be performed using a finite state machine. For example, it may be determined that an estimated focus setting for an image zone is to be excluded from the weighted sum using a finite state machine. A finite state machine is for example a model of a state of a system, which can be in one of a finite number of states at a given time. FIG. 12 illustrates schematically an example of a finite state machine 184. The finite state machine 184 includes a start state 186, an end state 188 and various different states in between. In this case, the system transitions between states based on a change in the value of the focus metric for a given image zone. Increases in the value of the focus metric are indicated using a solid line, decreases in the value of the focus metric that are less than or equal to a threshold decrease are indicated using a dotted line, and decreases in the value of the focus metric that are greater than the threshold decrease are indicated using a dashed line.

The system starts in the start state 186 after the first value of the focus metric has been obtained. If the second value of the focus metric increases, the system moves to a good 1 state 190. If the value further increases, the system moves to a good 2 state 192 and remains in the good 2 state as the value continues to increase. If the system is in the good 2 state and the value of the focus metric decreases by an amount which is greater than the threshold decrease, the system moves to the end state 188. If the system is in the good 2 state and the value of the focus metric decreases by an amount which is less than or equal to the threshold decrease, the system moves to a nearly state 194 and remains in the nearly state 194 if the value of the focus metric continues to decrease. If the system is in the nearly state 194 and the value of the focus metric decreases by an amount which is greater than the threshold decrease, the system moves to the end state 188. If the system reaches the end state 188, it may be determined that a reliable focus setting may be estimated from the values of the focus metric obtained.

If, however, the system is in the start state 186 and the value of the focus metric decreases by an amount which is less than or equal to the threshold decrease, the system moves to a warning state 198 and remains in the warning state 198 if the value of the focus metric continues to decrease. If the system is in the warning state 198 and the value of the focus metric decreases by an amount which is greater than the threshold decrease, the system moves to a reject state 200. The image zone may then be rejected as being unreliable. If the system is in the warning state 198 and the value of the focus metric increases, the system moves to the OK state 202. If the system is in the OK state 202 and the value of the focus metric decreases, the system moves to the reject state 200 and the image zone may be rejected. If, however, the system is in the OK state 202 and the value of the focus metric increases, the system moves to the good 2 state 194.

Image zones which appear to be reliable may later be rejected if the value of the focus metric increases and then begins to decrease or increases, decreases and then begins to increase again. For example, if the system is in the good 1 state 190 and the value of the focus metric then decreases, the system transitions to the warning state 198. Similarly, if the system is in the nearly state 196 and the value of the focus metric then increases, the system transitions to the reject state 200.

It is to be appreciated that the finite state machine 184 of FIG. 12 is merely an example, and other finite state machines may be used in other examples.

Methods similar to those of FIGS. 9 to 12 may be adapted to obtain focus settings for capture of images of a scene including objects at multiple depths. For example, such a scene may include an object in a foreground, which is closer to the image capture device than another object in a background of the scene. The flow diagram of FIG. 13 illustrates an example method for obtaining focus settings in such cases.

Figure 13:
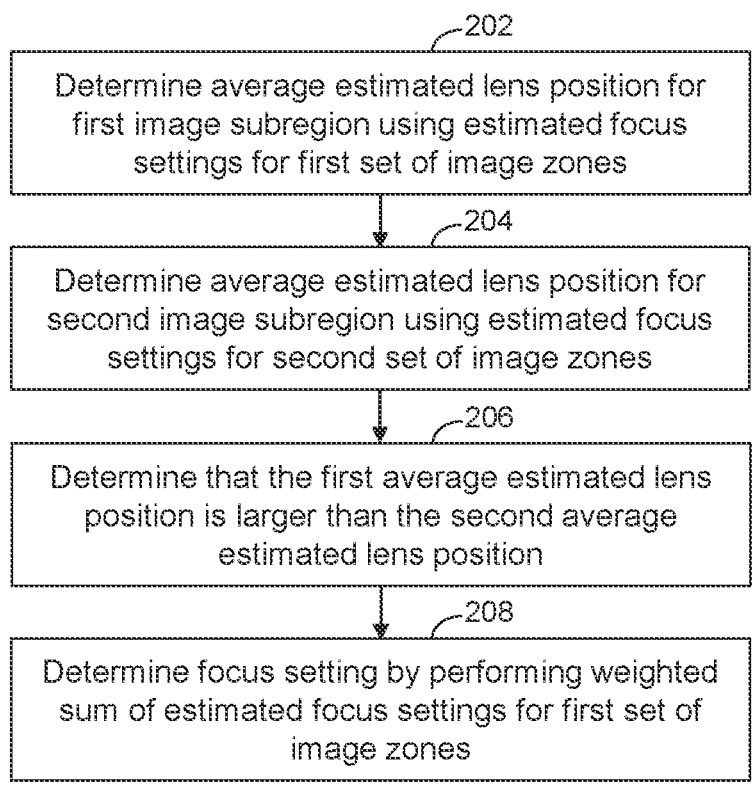
FIG. 13 is a flow diagram showing features of the method of FIG. 9 according to some further examples.

Prior to applying the method of FIG. 13, estimated focus settings are obtained for a plurality of image zones corresponding, e.g. using the methods of FIGS. 9 to 12. The rise and fall of the focus metric values for the image zones may be counted to obtain a fluctuation count per image zone. A fluctuation map representative of the fluctuation count for the plurality of image zones may then be obtained. A fluctuation count for example represents a number of changes in a direction of change of the focus metric value. For example, if the focus metric value for a given image zone increases and then decreases, the fluctuation count may be one. Similarly, if the focus metric value for another image zone increases, decreases and then increases again, the fluctuation count may be two.

The values of the focus metric may be obtained for each of a plurality of different focus settings for the image capture device (such as different lens positions). This may be performed either until focus metric values have been obtained for each of a predetermined plurality of different focus settings or until estimated focus settings have been obtained for at least a predetermined amount or proportion of the image zones, such as at least 55% of the image zones.

At this point, different image portion geometries (such as rows, columns, or 3×3 image patches) may be overlaid on the plurality of image zones. Each of the geometries which satisfy a certain criteria indicative that the geometry may correspond to a foreground of a scene (or a portion of the scene at a different position relative to the image capture device than other portions) may be selected for further processing. For example, each of the geometries for which an estimated focus setting has not been obtained for a predetermined proportion of the image zones (such as two thirds) may be selected. If any of these geometries are relatively dark (such as with a predetermined proportion, e.g. two thirds, of image zones which are too dark, e.g. with an intensity value less than a predetermined threshold), these geometries may be deselected. Similarly, if the fluctuation count for a given geometry meets or exceeds a given threshold, e.g. if the fluctuation count is similar to the number of different focus settings for which the focus metric values have been obtained, the geometry may also be deselected.

If, after this process, no geometries remain selected, the focus setting for the plurality of image zones may be obtained as described with reference to FIGS. 9 to 12. If, however, at least one geometry is selected, the image zones corresponding to the at least one geometry selected may be combined as an image subregion. A process for obtaining estimated focus settings may be performed on the image subregion, e.g. by continuing to obtain focus metric values for a further plurality of different focus settings for the image capture device. This process may be the same as that described with reference to FIGS. 9 to 12 and may continue until an estimated focus setting has been obtained for greater proportion than prior to overlaying the image portion geometries on the image zones, e.g. 95% rather than 55%.

The estimated focus settings may then be clustered into clusters, e.g. so that similar estimated focus settings may be grouped together into a cluster. In this way, a first image subregion comprising a first set of the plurality of image zones and a second image subregion comprising a second set of the plurality of image zones may be identified. The first and second image subregions are for example non-overlapping and may be adjacent to each other or separated from each other by at least one further image zone. After identification of the first and second image subregions, the method of FIG. 13 may be applied.

At item 202 of FIG. 13, a first average estimated lens position for the first image subregion is determined using the estimated focus settings for the first set of the plurality of image zones.

At item 204 of FIG. 13, a second average estimated lens position for the second image subregion is determined using the estimated focus settings for the second set of the plurality of image zones. Item 204 may be performed for a plurality of different image subregions, each corresponding to a respective cluster of estimated focus setting values, in cases where there are a plurality of clusters.

At item 206 of FIG. 13, it is determined that the first average estimated lens position is larger than the second average estimated lens position. For example, it may be determined that the first average estimated lens position is larger than any of a plurality of other average estimated lens positions corresponding to other clusters. It is to be appreciated that any suitable averaging method may be used, such as the calculation of a mean, median or mode. In this way, it may be determined that the first image subregion corresponds to a foreground of a scene, which is closer to the image capture device than other parts of the scene.

At item 208 of FIG. 13, the focus setting is determined by performing the weighted sum of the estimated focus setting for the first set of the plurality of image zones, for example as described with reference to item 178 of FIG. 9.

In some cases, item 208 may be performed if the first set of the plurality of image zones satisfies certain criteria indicating that it is reliable and likely to accurately correspond to a foreground. For example, item 208 may not be performed if the first set includes fewer than two image zones. Item 208 may also not be performed if a distance between the lens positions for the first set and the lens positions for the second set is less than a given threshold, as this indicates that the first and second sets may include parts of a scene that are relatively similar in distance to the image capture device. Item 208 may also be omitted if a dispersion of the lens positions for the first set meets or exceeds a dispersion threshold, as this suggests that these lens positions may not be reliable or that the first set may include parts of a scene that are at a wide range of distances from the image capture device, rather than corresponding to a foreground.

In cases in which item 208 is omitted, the focus setting for the image capture device may be performed by performing a weighted sum of the estimated focus settings for image zones including those outside the first set, such as the first and second sets combined, or each of the plurality of image zones the image is divided into (or each for which an estimated focus setting has been found).

The intensity of light captured by sensor pixels of an image capture device generally depends on the focus settings of the image capture device. Hence, changing the focus settings may change the intensity of light captured. This is for example due to the zooming effect of a lens of the image capture device, which means that each image zone tends to gather more photons when a lens is at a position to focus on an object at infinity then when the lens is at a position to focus on an object closer to the lens. For example, the image field of view may be increased as the lens is moved further away from the image sensor of the image capture device. This means that light incident on the lens is projected by the lens onto a smaller area of the image sensor, which increases the amount of light focused onto a given sensor pixel. This effect may not be noticeable in some focus metrics, e.g. such as the E2 metric discussed above, or other focus metrics which are relatively independent of light intensity, and/or for certain lighting conditions. For example, this effect may be imperceptible where a scene is well illuminated for a focus metric of E2/I2, due to the dominance of the E2 metric over the I2 metric. However, this effect may be perceivable when captured images are relatively dark or noisy, e.g. in which I2 dominates with respect to E2. This may be perceivable as a gradual increase in an underlying intensity of light captured by the image capture device as the lens position is increased. Contrast-based features may then be visible as a bump on top of a gradually increasing curve of the focus metric, where the gradual increase corresponds to an increasing intensity of light as the lens position is increased.

Figure 14:
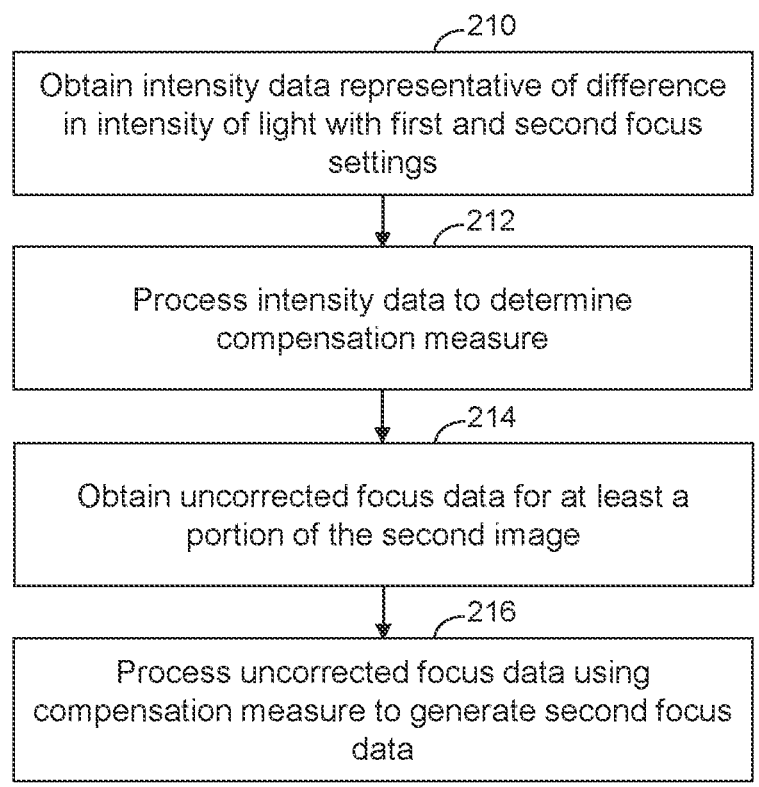
FIG. 14 is a flow diagram showing features of the method of FIG. 9 according to some still further examples.

FIG. 14 is a flow diagram illustrating an example of a method which be used to counteract this effect, to compensate for changes in a value of a focus metric that are due to a global or overall change in the intensity of light captured, rather than a change which is indicative of a change in contrast.

At item 210 of FIG. 14, intensity data representative of a difference in an intensity of light captured by the image capture device with the first focus setting and the second focus setting is obtained. This difference may be captured in the form of a graph. For example, a graph of focus metric may be obtained for at least a portion of a plurality of images obtained with different respective focus settings. The value of the focus metric may indirectly represent the difference in the intensity of light captured with the first and second focus settings. In other cases, the intensity of light capture with the first and second focus settings may be determined directly, for example from the image intensity of images captured with the first and second focus settings, respectively. The image intensity for example refers to a sum or average of pixel values of an image or image portion.

Figure 15:
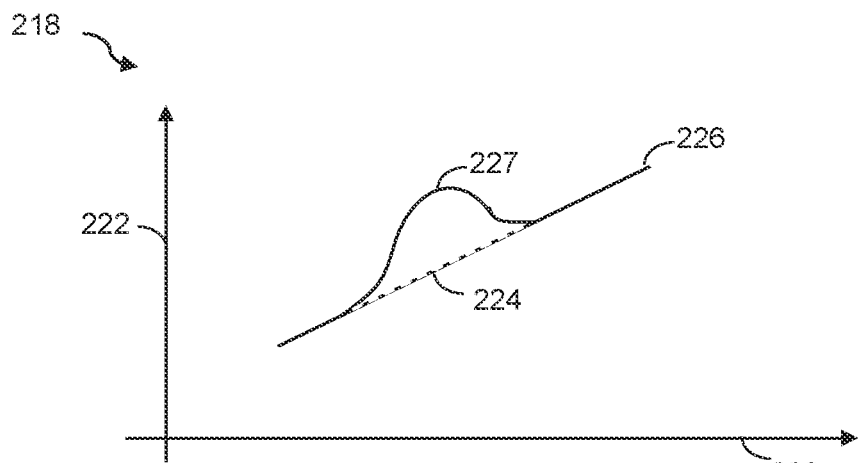
FIG. 15 is a graph showing schematically the relationship between a focus metric and lens position according to examples.

FIG. 15 shows schematically an example of a graph 218 of focus metric, which in this example is the focus metric of E2/I2. The graph 218 of FIG. 5 illustrates the dependence of the focus metric on the light intensity, as a function of lens position. For the focus metric of E2/I2, the E2 metric is relatively invariant to the position of the lens. However, the I2 metric (which corresponds to a sum of squared pixel values for at least a subset of pixels of an image or image portion) may be sensitive to lens position, at least in certain cases (e.g. in low light conditions). For example, I2 may decrease with focus position, meaning that the reciprocal of I2 increases. The dashed line 224 illustrates the contribution of the increase in the reciprocal of I2 to the actual focus metric E2/I2, which is shown with a solid line 226 in FIG. 15. The x-axis 220 of the graph 218 corresponds to a lens position (which is the focus setting in this example) and the y-axis 222 of the graph 218 corresponds to the value of the focus metric E2/I2. The graph 218 has a bump 227 corresponding to an optimal lens position for the image capture device. However, using the methods described, the lens position obtained from the graph 218 for future operation of the image capture device (which for example corresponds to a highest image intensity) may be calculated as infinity rather than a position corresponding to the bump 227, due to the underlying increase in image intensity as the lens position increases.

Referring back to FIG. 14, at item 212 of FIG. 14, the intensity data is processed to determine a compensation measure to apply to the focus metric to compensate for the difference in the intensity of light. The compensation measure is for example an inverse function to counteract the change in overall image intensity due to a change in focus setting. This may for example involve obtaining a graph of or depending on the image intensity, fitting a straight line function to the straight portions of the graph and using the straight line function as the compensation measure or to obtain the compensation measure.

For example, if it is assumed that the decrease of I2 is linear, the value of I2 as a function of lens position, p, may be expressed as:

$$I2(p)=(mp+1)I2'$$

where I2 is the measured intensity of light, p is the lens position, I2' is the corrected intensity (which is for example an intensity which is constant or approximately constant with changing lens position), and m is the slope of the graph due to the effect of changing lens position on light intensity. From this, the corrected I2' value may be obtained as:

$$I2' = \frac{I2(p)}{(mp+1)}$$

This allows the corrected I2' value to be obtained from the measured I2 value by dividing the measured I2 value by the determined factor. m can be obtained during calibration of a given image sensor or may be calculated using a range of separation between the lens and the image sensor.

It is to be appreciated that this may be a simplification of the underlying relationship between the corrected and uncorrected image intensity values, which may be more straightforward to determine than the actual relationship. For example, the actual relationship may be non-linear, which may be more computationally expensive to calculate.

At item 214 of FIG. 14, uncorrected focus data representative of an uncorrected value of the focus metric for at least the portion of the second image captured with the second focus setting for the image capture device is obtained.

At item 216 of FIG. 14, the uncorrected focus data is processed using the compensation measure to generate the second focus data representative of the second value of the focus metric. In this way, the effect of the underlying increase in image intensity due to increasing distance between the lens and the image capture device can be reduced or eliminated, allowing a more accurate focus metric to be determined.

Items 210 and 212 of FIG. 14 may for example be performed by capturing a relatively dark scene, e.g. during a calibration process for the image capture device. This may be more efficient than performing this process repeatedly during operation of the image capture device (although this may nevertheless be performed in some cases). In other cases, the intensity data may be predicted intensity data, e.g. obtained from a predicted or expected performance of the image capture device. Although FIG. 14 is described in the context of the method of FIGS. 9 to 13 for obtaining an estimated focus setting for an image capture device, it is to be appreciated that the method of FIG. 14 may be performed with other methods for determining a focus setting for an image capture device and/or with other focus metrics than those described in detail herein.

Figure 16:
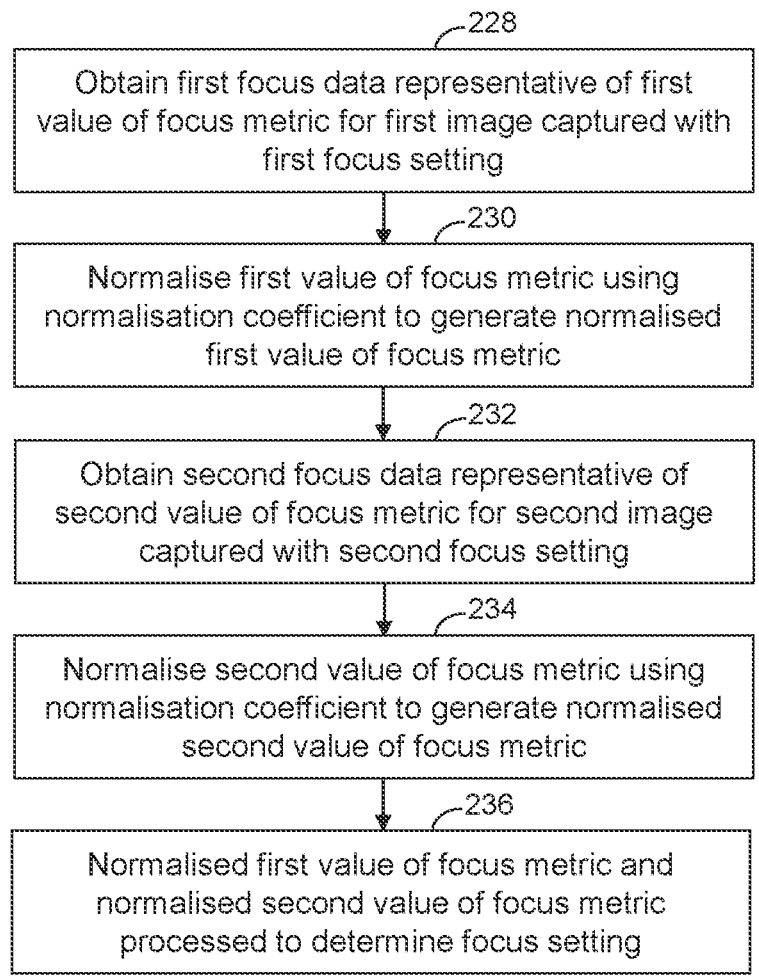
FIG. 16 is a flow diagram showing a method of determining a focus setting for an image capture device according to further examples.

FIG. 16 is a flow diagram showing a method of determining a focus setting for an image capture device according to further examples. At item 228 of FIG. 16, first focus data representative of a first value of a focus metric for at least a portion of a first image captured with a first focus setting for the image capture device is obtained. The contrast data obtained as described with references to FIGS. 3 to 8 may represent the focus metric, for example. However, in other cases, the method of FIG. 16 may be performed with a different focus metric, such as one that is derived using a different contrast-based characteristic than that of FIGS. 3 to 8. The portion of the first image may for example be an image zone of a plurality of image zones of the first image, or another portion of the first image such as an ROI. In some cases, the first focus data represents the first value of the focus metric for the entirety of the first image.

At item 230 of FIG. 16, the first value of the focus metric is normalised using a normalisation coefficient to generate a normalised first value of the focus metric. The normalisation coefficient may be a fixed or constant number. In some cases, though, the normalisation coefficient corresponds to the first value of the focus metric.

At item 232 of FIG. 16, second focus data representative of a second value of the focus metric is obtained for at least a portion of a second image captured with the second focus setting for the image capture device.

At item 234 of FIG. 16, the second value of the focus metric is normalised using the normalisation coefficient to generate a normalised second value of the focus metric.

At item 236 of FIG. 16, the normalised first value of the focus metric and the normalised second value of the focus metric are processed to determine the focus setting for the image capture device.

In some cases, normalised first and second values of the focus metric may be found for each of a plurality of image zones. In such cases, the normalised first and second values may be processed as described with reference to FIGS. 9 to 13 to determine the focus setting, e.g. using a weighted sum of the normalised first and second values for at least some of the image zones.

In other cases, processing the normalised first value of the focus metric and the normalised second value of the focus metric may include fitting a polynomial function to the normalised first value and the normalised second value and using the polynomial function to determine the focus setting for the image capture device. For example, the method may include determining normalised values of the focus metric for a plurality of different focus settings, e.g. until a predetermined number of focus settings has been reached or until it appears as if the normalised values of the focus metric are converging. For example, the method may include ceasing to investigate further focus settings once a difference between the most recently obtained normalised value of the focus metric and the previous normalised value of the focus metric meets or exceeds a given threshold. For example, if the most recent normalised value is at least 3% less than the previous normalised value, the focus setting may be determined using the obtained normalised values, without obtaining further normalised values.

The polynomial function in these cases is a function of focus setting. The order of the polynomial function may depend on the number of different focus settings a normalised value of the focus metric has been obtained for. For example, if normalised values have been obtained for at least four different focus settings, a third order polynomial may be fitted to the normalised values. If normalised values have been obtained for three different focus settings, a second order polynomial may be fitted to the normalised values. If normalised values have been obtained for two different focus settings, the focus setting used for subsequent operation of the image capture device may be set to a default or otherwise predetermined value. For example, a lens position of a lens of the image capture device may be set for the lens to focus on an object at an infinite distance from the lens. In other cases, if normalised values have been obtained for two different focus settings at this stage, the method may include obtaining further normalised values for additional different focus settings, to try to obtain at least normalised values for at least three different focus settings.

After fitting the polynomial function, the focus setting may be taken as the focus setting (e.g. lens position) corresponding to a maximum of the polynomial.

In some cases, methods in accordance with FIG. 16 may involve accumulating (e.g. by summing) the normalised first values for each of a plurality of image zones within an image region (such as an ROI). The normalised values for other focus settings than the first focus setting may be similarly accumulated within a given ROI. The polynomial function may be fitted to the accumulated values, rather than to normalised values for a single image zone, which may allow an appropriate focus setting to be determined more efficiently.

Image Processing System

Figure 17:
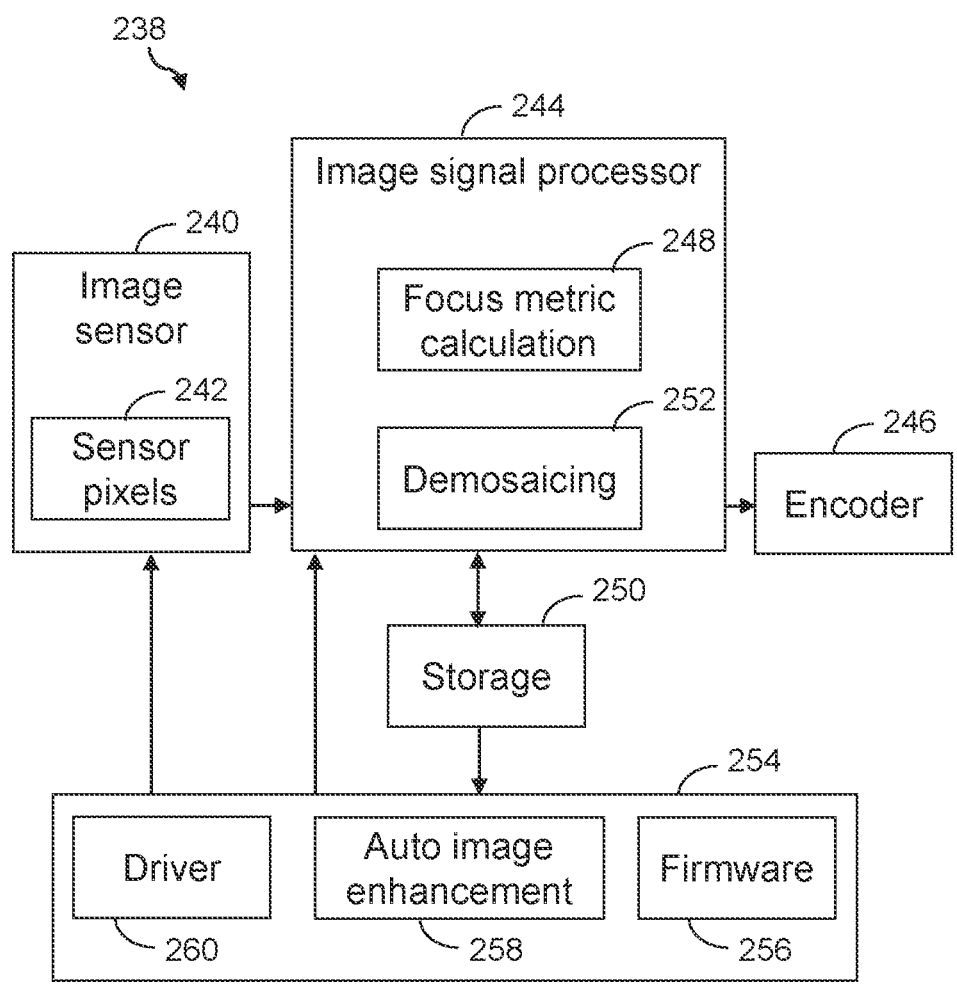
FIG. 17 is a schematic diagram of components of an image processing system according to examples.

The examples described herein may be implemented using an image processing system 238 such as that illustrated schematically in FIG. 17.

The image processing system 238 of FIG. 10 includes an image sensor 240, such as those described above. The image sensor 240 includes a sensor pixels 242 for capturing light. Light received at the image sensor 240 is converted to image data. The image data is transferred to an image signal processor 244, which is typically configured to generate output image data representative of at least part of an output image. The output image data may be encoded via an encoder 246 before being transferred to other components, for example for storage or further processing. The image signal processor 244 typically includes a number of units that are configured to perform various processing on the image data, to generate the output image data. Image signal processors such as the image signal processor 244 of FIG. 17 may include a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The image signal processor 244 in the example of FIG. 17 is arranged to calculate a value of a focus metric such as those described herein, and may therefore be considered to include a focus metric calculation unit 248. Data for use in, or generated as part of the focus metric calculation unit 248 may be stored in storage 250 of the image processing system 238. The storage 250 may include at least one of volatile memory, such as a Random Access Memory (RAM) and non-volatile memory, such as Read Only Memory (ROM) or a solid state drive (SSD) such as Flash memory. The storage 250 is for example an on-chip memory or buffer that may be accessed relatively rapidly by the image signal processor 244. In other examples, though, the storage 250 may include further storage devices, for example magnetic, optical or tape media, compact disc (CD), digital versatile disc (DVD) or other data storage media. The storage 250 may be removable or non-removable from the image processing system 238. The storage 250 in FIG. 17 is communicatively coupled to the image signal processor 244 so that data can be transferred between the storage 250 and the image signal processor 244. For example, the storage 250 may store image data representative of at least a portion of an image (such as image data prior to demosaicing) as well as data generated during the calculation of a value of a focus metric, such as that described above.

The image signal processor 244 may also include a demosaicing system 252 for demosaicing image data for use in the focus metric calculation 248. The demosaicing system 252 may be arranged to perform grayscale demosaicing to obtain a grayscale intensity at respective pixel positions from data obtained from the image sensor (which is for example Bayer data). For example, the demosaicing system 252 need not obtain RGB data and may instead obtain grayscale data. In such cases, the sensor data used to determine the focus setting may be the grayscale data obtained by the demosaicing system 252, which may be considered to correspond to values in a grayscale intensity plane Y. In other cases, though, the sensor data used to determine the focus setting may be the Bayer data itself, obtained from the sensor pixels prior to undergoing demosaicing.

The image processing system 238 of FIG. 17 also includes a controller 254 for controlling features or characteristics of the image sensor 240. The controller 254 may include hardware or software components or a combination of hardware and software. For example, the controller 254 may include firmware 256 which includes software for controlling the operation of the controller 254. The firmware 256 may be stored in non-volatile memory of the controller 254 or in the storage 250 (which is accessible to the controller 254). The controller 254 of FIG. 17 also includes an auto image enhancement system 258, which for example is configured to perform processing to determine whether adjustments need to be made to the image processing system 238 to improve the image quality. For example, the auto image enhancement system 258 may include an auto exposure module (e.g. arranged to perform contrast-based autofocus), an auto white balance module and/or an auto focus module. For example, that auto image enhancement system 258 may include a focus controller, such as a contrast-based autofocus controller. In other cases, the focus controller may be a separate unit of the controller 254 and/or the auto image enhancement system 258 may be otherwise omitted. The controller 254 also includes a driver 260 for controlling the operation of the image sensor 240. For example, the driver 260 may control a configuration of the image sensor 240, such as a lens position, such that the image sensor 240 is in a configuration corresponding to a particular focus setting.

A data collection process, which may be referred to as a statistics collection process, may be performed using hardware, such as hardware of the controller 254 or of the image signal processor 238, such as by the focus metric calculation unit 248, which may obtain statistics (such as the contrast data) based on image data obtained by an image capture device including the image signal processor 238.

The processing of statistics, for example as described with reference to FIGS. 9 to 16, to determine a focus setting for the image capture device, may for example be performed using firmware, such as the firmware 256 of the controller 254 or firmware associated with the image signal processor 244. This is not intended to be limiting, though; the focus setting may be determined using software, hardware or a combination of hardware and software.

Components of the image signal processor 244 may be interconnected using a systems bus, which allows data to be transferred between the various components.

Data Processing Using a System-on-a-Chip

Figure 18:
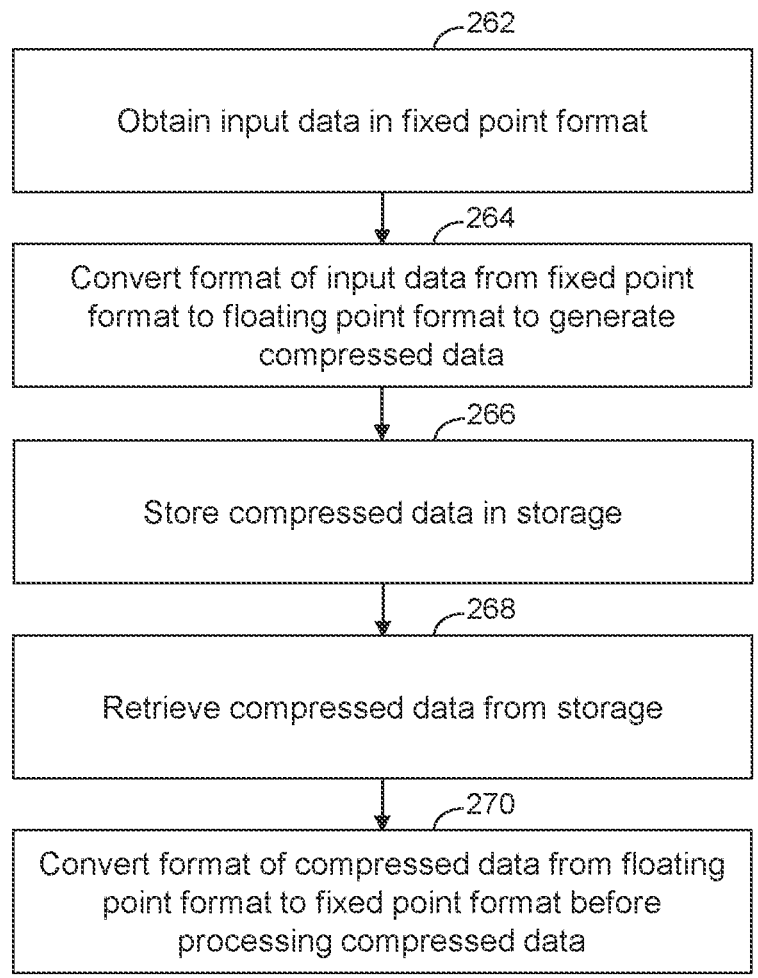
FIG. 18 is a flow diagram showing a method of data processing according to examples.

As described with reference to FIG. 7, a format of data may be converted to improve the efficiency of storage of the data. FIG. 18 is a flow diagram showing a method of data processing according to examples such as this.

At item 262 of FIG. 18, input data in a fixed point format is obtained. The input data is, for example, derived from image data representative of an image. However, this is merely an example.

At item 264 of FIG. 18, a format of the input data is converted from the fixed point format to a floating point format to generate compressed data.

At item 266 of FIG. 18, the compressed data is stored in storage. The storage is for example local storage, such as on-chip storage of a system-on-a-chip.

At item 268 of FIG. 18, the compressed data is retrieved from the storage.

At item 270 of FIG. 18, a format of the compressed data is converted from the floating point format to the fixed point format before processing the compressed data. Processing the compressed data for example includes processing the compressed data as part of an image processing pipeline.

The approach of FIG. 18 is counterintuitive but nevertheless allows the data to be stored and/or processed more efficiently. For example, in typical systems-on-a-chip, which may include an integrated circuit such as an application-specific integrated circuit (ASIC), data to be processed is stored in a format with a fixed bit size, so that all data processed by the ASIC has the same bit size. This approach involves converting the data to a floating point format, which may have a different bit size depending on the data to be converted. This allows the data to be stored more efficiently, but involves a further processing step, to convert the data back to the fixed point format before processing. Despite this, the method of FIG. 18 is nevertheless more efficient, as the compressed data generally has lower storage requirements (e.g. due to a smaller bit size) than the data in the fixed point format. The compressed data may therefore be stored, and retrieved from storage, more efficiently than otherwise. For example, the storage bandwidth and/or the storage area may be reduced.

The above examples are to be understood as illustrative examples. Further examples are envisaged.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of determining a focus setting for an image capture device, the method comprising:
for each of a plurality of image zones:
obtaining a first value of a focus metric for the respective image zone using a first image captured with a first focus setting for the image capture device;

obtaining a second value of the focus metric for the respective image zone using a second image captured with a second focus setting for the image capture device; and processing the first value and the second value to obtain an estimated focus setting for the respective image zone;

obtaining a dispersion metric representative of a dispersion of the estimated focus settings for the plurality of image zones; and determining the focus setting by performing a weighted sum of the estimated focus setting for at least two of the plurality of image zones, wherein performing the weighted sum comprises using the dispersion metric to weight the estimated focus setting for the at least two of the plurality of image zones.

2. The method according to claim 1, comprising obtaining an average estimated focus setting using at least two of the estimated focus settings, wherein performing the weighted sum comprises weighting the estimated focus settings for the at least two of the plurality of image zones based on a difference between the respective estimated focus setting and the average estimated focus setting.

3. The method according to claim 1, comprising, for an image zone of the plurality of image zones, determining that the estimated focus value for the image zone is to be excluded from the weighted sum based on a comparison between the first value and the second value.

4. The method according to claim 3, wherein determining that the estimated focus setting for the image zone is to be excluded from the weighted sum uses a finite state machine.

5. The method according to claim 1, wherein a first set of the plurality of image zones corresponds to a first image subregion and a second set of the plurality of image zones corresponds to a second image subregion and the method comprises:

determining a first average estimated lens position for the first image subregion using the estimated focus settings for the first set of the plurality of image zones;

determining a second average estimated lens position for the second image subregion using the estimated focus settings for the second set of the plurality of image zones;

determining that the first average estimated lens position is larger than the second average estimated lens position; and determining the focus setting by performing the weighted sum of the estimated focus settings for the first set of the plurality of image zones.

6. The method according to claim 5, wherein the first image subregion comprises a foreground of the image, and the second image subregion comprises a background of the image.

7. The method according to claim 1, comprising:

obtaining intensity data representative of a difference in an intensity of light captured by the image capture device with the first focus setting and with the second focus setting;

processing the intensity data to determine a compensation measure to apply to the focus metric to compensate for the difference in the intensity of light;

obtaining uncorrected focus data representative of an uncorrected value of the focus metric for at least the portion of the second image captured with the second focus setting for the image capture device; and processing the uncorrected focus data using the compensation measure to generate the second focus data representative of the second value of the focus metric.

8. The method according to claim 7, wherein the intensity data is indicative of a plurality of intensity metrics, each for a respective image of a plurality of images captured by the image capture device, the plurality of images comprising the first image and the second image, and determining the compensation measure comprises:

fitting a straight line function to a distribution of the plurality of intensity metrics; and at least one of: using the straight line function as the compensation measure, or using the straight line function to obtain the compensation measure.

9. The method according to claim 8, wherein the compensation measure is expressable as: mp+1, where m represents a slope of the straight line function and p is a lens position at which the second image is captured.

10. The method according to claim 1, wherein the plurality of image zones are based on processing of the image to identify at least one region of interest (RoI) of the image.

11. The method according to claim 1, wherein the weighted sum accounts for a difference in image characteristics between the at least two of the plurality of image zones.

12. The method according to claim 1, wherein, in the weighted sum, an image zone of the plurality of image zones corresponding to a region of interest (RoI) has a higher weighting than an other image zone of the plurality of image zones corresponding to a non-RoI.

13. The method according to claim 1, comprising:

obtaining sensor data captured by the image capture device, wherein the sensor data comprises pixel values from respective sensor pixels of an image sensor of the image capture device, and the sensor data is representative of the first image;

dynamically selecting a subset of the pixel values to generate selected sensor data representative of the subset of the pixel values;

processing the selected sensor data to generate contrast data representative of a contrast-based characteristic of at least a portion of the first image; and processing the contrast data to determine the first focus setting for the image capture device.

14. The method according to claim 13, wherein processing the selected sensor data comprises:

processing the selected sensor data to generate intensity characteristic data representative of the subset of the pixel values squared and then summed;

processing the selected sensor data to generate filtered data representative of an output of a band-pass filtering process, for each of the subset of the pixel values, squared and then summed; and dividing the filtered data by the intensity characteristic data to generate the contrast data.

15. The method according to claim 13, comprising converting the contrast data from a fixed point data format to a floating point data format before storing the contrast data in storage.

16. The method according to claim 1, wherein the first value is a normalised first value obtained using a normalisation coefficient, and the second value is a normalised second value obtained using the normalisation coefficient.

17. The method according to claim 16, wherein the normalisation coefficient corresponds to the first value prior to normalisation.

18. An image processing system for determining a focus setting for an image capture device, the image processing system comprising:
  storage to store:
    first image data representing a first image captured with a first focus setting for the image capture device;
    second image data representing a second image captured with a second focus setting for the image capture device; and,
  communicatively coupled to the storage, an image signal processor to perform a method comprising:
    for each of a plurality of image zones:
      obtaining a first value of a focus metric for the respective image zone using the first image;
      obtaining a second value of the focus metric for the respective image zone using the second image; and
      processing the first value and the second value to obtain an estimated focus setting for the respective image zone;
    obtaining a dispersion metric representative of a dispersion of the estimated focus settings for the plurality of image zones; and
    determining the focus setting by performing a weighted sum of the estimated focus setting for at least two of the plurality of image zones,
    wherein performing the weighted sum comprises using the dispersion metric to weight the estimated focus setting for the at least two of the plurality of image zones.

19. The image processing system according to claim 18, wherein the image signal processor comprises a demosaicing system for grayscale demosaicing of data obtained from an image sensor of the image capture device to obtain a grayscale intensity at respective pixel positions, and the first image data is first demosaiced image data obtained by the demosaicing system, and the second image data is second demosaiced image data obtained by the demosaicing system.

* * * * *